US012656731B2

(12) United States Patent
Sato

(10) Patent No.: US 12,656,731 B2
(45) **Date of Patent: *Jun. 16, 2026**

(54) IMAGE FORMING APPARATUS HAVING PROCESS CARTRIDGE WITH FRAME AND MOVABLE ENGAGING PORTION

(71) Applicant: BROTHER KOGYO KABUSHIKI KAISHA, Nagoya (JP)

(72) Inventor: Shougo Sato, Seto (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/792,759

(22) Filed: Aug. 2, 2024

(65) Prior Publication Data

US 2024/0393739 A1 Nov. 28, 2024

Related U.S. Application Data

(63) Continuation of application No. 18/299,902, filed on Apr. 13, 2023, now Pat. No. 12,078,955, which is a (Continued)

(30) Foreign Application Priority Data

Jul. 2, 2019 (JP) ................................ 2019-123951

(51) Int. Cl.

| | |
|---|---|
| ***G03G 21/16*** | (2006.01) |
| ***G03G 15/08*** | (2006.01) |
| ***G03G 21/18*** | (2006.01) |

(52) U.S. Cl.

CPC ..... *G03G 21/1842* (2013.01); *G03G 15/0867* (2013.01); *G03G 21/1623* (2013.01); *G03G 21/1814* (2013.01); *G03G 21/1817* (2013.01)

(58) Field of Classification Search

CPC .......... G03G 15/0867; G03G 21/1623; G03G 21/1814; G03G 21/1817; G03G 21/1842

See application file for complete search history.

(56) References Cited

U.S. PATENT DOCUMENTS 8,290,395 B2 10/2012 Uchida
8,948,652 B2 2/2015 Abe
(Continued)

FOREIGN PATENT DOCUMENTS

JP H06-43706 A 2/1994
JP 2009-092914 A 4/2009
(Continued)

*Primary Examiner* — Hoang X Ngo
(74) *Attorney, Agent, or Firm* — Merchant & Gould P.C.

(57) ABSTRACT

An image forming apparatus includes: a housing; a process cartridge including a photoconductive drum and a developing roller; a toner cartridge containing toner; and a drawer movable between an inner position and an outer position. The process cartridge includes a lock member movable between a lock position at which the lock member locks the process cartridge to the drawer, and a release position at which a lock between the process cartridge and the drawer is released. The lock member is located at the lock position in a state in which the process cartridge is mounted to the drawer, and the toner cartridge is mounted to the process cartridge. The lock member is located at the release position in a state in which the process cartridge is mounted to the drawer, and the toner cartridge is removed from the process cartridge.

8 Claims, 15 Drawing Sheets

Related U.S. Application Data continuation of application No. 17/811,913, filed on Jul. 12, 2022, now Pat. No. 11,656,574, which is a continuation of application No. 17/407,444, filed on Aug. 20, 2021, now Pat. No. 11,429,061, which is a continuation of application No. 16/907,599, filed on Jun. 22, 2020, now Pat. No. 11,156,955.

(56) References Cited

U.S. PATENT DOCUMENTS

| | | | | |
|---|---|---|---|---|
| 10,564,596 | B2 | 2/2020 | Itabashi et al. | |
| 2008/0181660 | A1 | 7/2008 | Mase et al. | |
| 2009/0092412 | A1 | 4/2009 | Kei | |
| 2010/0080622 | A1 | 4/2010 | Uchida | |
| 2010/0239313 | A1 * | 9/2010 | Maeda | G03G 21/168<br>399/114 |
| 2013/0156464 | A1 | 6/2013 | Suzuki et al. | |
| 2017/0102640 | A1 | 4/2017 | Sato | |
| 2019/0369548 | A1 | 12/2019 | Ichikawa | |

FOREIGN PATENT DOCUMENTS

| | | | |
|---|---|---|---|
| JP | 2010-102303 | A | 5/2010 |
| JP | 2013-127583 | A | 6/2013 |
| JP | 2016-166981 | A | 9/2016 |

* cited by examiner

IMAGE FORMING APPARATUS HAVING PROCESS CARTRIDGE WITH FRAME AND MOVABLE ENGAGING PORTION

CROSS REFERENCE TO RELATED APPLICATIONS

This application is a continuation of U.S. patent application Ser. No. 18/299,902, filed Apr. 13, 2023, now U.S. Pat. No. 12,078,955, which is a continuation of U.S. patent application Ser. No. 17/811,913, filed Jul. 12, 2022, now U.S. Pat. No. 11,656,574, which is a continuation of U.S. patent application Ser. No. 17/407,444, filed Aug. 20, 2021, now U.S. Pat. No. 11,429,061, which is a continuation of U.S. patent application Ser. No. 16/907,599, filed Jun. 22, 2020, now U.S. Pat. No. 11,156,955, which claims priority from Japanese Patent Application No. 2019-123951 filed on Jul. 2, 2019, the entireties of which are incorporated herein by reference.

BACKGROUND

The following disclosure relates to an image forming apparatus.

There has been known an electrophotographic image forming apparatus in which a process cartridge including a photoconductive drum and a toner container is removably mounted to a drawer. The image forming apparatus of this type requires replacement of the process cartridge when the toner container becomes empty of toner. However, the photoconductive drum has not reached the end of its useful life at this time, and thus the photoconductive drum is discarded before the end of the useful life, resulting in increase in running costs.

To solve this problem, an image forming apparatus is devised in which the process cartridge is separated into a drum cartridge including the photoconductive drum and a toner cartridge including the toner container to enable individual replacement of the drum cartridge and the toner cartridge.

In such an image forming apparatus, unfortunately, the drum cartridge is mounted to the drawer, and the toner cartridge is mounted to the drum cartridge, but the toner cartridge moves relative to the drawer in removal of the toner cartridge from the drum cartridge, making it difficult to remove the toner cartridge.

SUMMARY

Accordingly, an aspect of the disclosure relates to an image forming apparatus capable of making a drum cartridge immovable relative to a drawer when a toner cartridge is removed from the drum cartridge mounted to the drawer.

In one aspect of the disclosure, an image forming apparatus includes: a housing; a process cartridge including a photoconductive drum and a developing roller; a toner cartridge containing toner; and a drawer movable between an inner position and an outer position, the process cartridge being located in the housing when the drawer is located at the inner position in a state in which the process cartridge is mounted to the drawer, at least a portion of the process cartridge being exposed to an outside of the housing when the drawer is located at the outer position in the state in which the process cartridge is mounted to the drawer. The process cartridge includes a lock member movable between a lock position at which the lock member locks the process cartridge to the drawer in the state in which the process cartridge is mounted to the drawer, and a release position at which a lock between the process cartridge and the drawer is released. The lock member is located at the lock position in a state in which the process cartridge is mounted to the drawer, and the toner cartridge is mounted to the process cartridge. The lock member is located at the release position in a state in which the process cartridge is mounted to the drawer, and the toner cartridge is removed from the process cartridge.

BRIEF DESCRIPTION OF THE DRAWINGS

The objects, features, advantages, and technical and industrial significance of the present disclosure will be better understood by reading the following detailed description of the embodiment, when considered in connection with the accompanying drawings, in which.

EMBODIMENT

Hereinafter, there will be described one embodiment by reference to the drawings. It is to be understood that the following embodiment is described only by way of example, and the disclosure may be otherwise embodied with various modifications without departing from the scope and spirit of the disclosure.

Overall Configuration of Image Forming Apparatus

Figure 1:
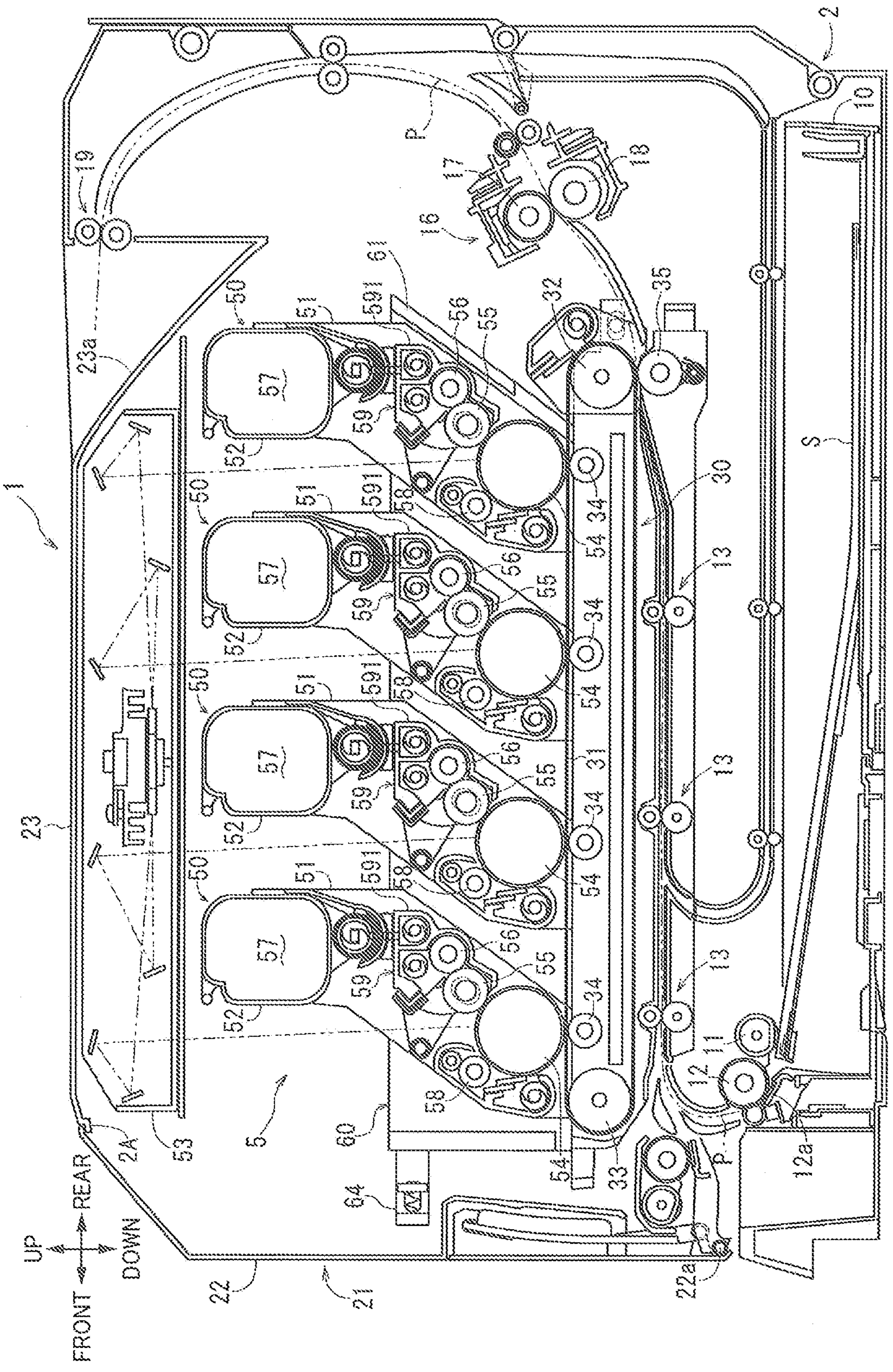
FIG. 1 is a central cross-sectional view of an image forming apparatus.

FIG. 1 illustrates an image forming apparatus 1 according to one embodiment of the present disclosure. The image forming apparatus 1 is an electrophotographic tandem color printer configured to form an image on a sheet S in multiple colors.

In the following description, the left side in FIG. 1 is defined as a front side of the image forming apparatus 1, the right side in FIG. 1 as a rear side of the image forming apparatus 1, the front side of the sheet of FIG. 1 as a right side of the image forming apparatus 1, and the back side of the sheet of FIG. 1 as a left side of the image forming apparatus 1. The upper side and the lower side in FIG. 1 are defined as an upper side and a lower side of the image forming apparatus 1, respectively.

The image forming apparatus 1 includes: a housing 2; a sheet-supply tray 10 capable of supporting the sheet S; and an image forming device 5 configured to form an image on the sheet S.

The housing 2 has a substantially rectangular parallelepiped shape and houses the sheet-supply tray 10 and the image forming device 5. A front surface 21 of the housing 2 has an opening 2A. The housing 2 includes a front-surface cover 22 capable of exposing and closing the opening 2A.

A pivot shaft 22*a* is provided at a lower end portion of the front-surface cover 22. The front-surface cover 22 is pivotable about the pivot shaft 22*a*. The opening 2A is exposed and closed by pivotal movement of the front-surface cover 22 about the pivot shaft 22*a*. A sheet-discharge tray 23*a* is provided on an upper surface 23 of the housing 2. The sheet-discharge tray 23*a* is inclined so as to be lower at its rear portion than its front portion.

A conveyance path P for the sheet S is formed in the housing 2 so as to extend from the sheet-supply tray 10 to the sheet-discharge tray 23*a* via the image forming device 5. Sheet-supply rollers 11, separating rollers 12, and a separator pad 12*a* are provided in the housing 2. The sheets S supported on the sheet-supply tray 10 are separated into one and the other by the sheet-supply rollers 11, the separating rollers 12, and the separator pad 12*a* and supplied one by one into the conveyance path P.

The image forming device 5 is disposed over the sheet-supply tray 10 and includes four process units 50 arranged side by side in the front and rear direction. The process units 50 are mountable and removable on and from the housing 2 and provided so as to correspond respectively to black, yellow, magenta, and cyan.

The housing 2 includes a drawer 60 that supports the process units 50. Each of the process units 50 includes a process cartridge 51 and a toner cartridge 52. The process cartridge 51 is removably mounted on the drawer 60. The toner cartridge 52 is removably mounted on the process cartridge 51.

The process cartridge 51 includes a photoconductive drum 54, an electrically charged roller 58, and a developing unit 59. The photoconductive drum 54 has a substantially cylindrical shape with its axial direction coinciding with the right and left direction. The photoconductive drum 54 is rotatably supported by the process cartridge 51. The electrically charged roller 58 extends in the right and left direction and is held in contact with an upper front portion of the photoconductive drum 54.

The developing unit 59 includes a developing roller 55, a supply roller 56, and a unit frame 591 supported by the process cartridge 51. The developing roller 55 extends in the right and left direction and is rotatably supported by the unit frame 591. The developing roller 55 is held in contact with an upper rear portion of the photoconductive drum 54. The supply roller 56 extends in the right and left direction and is rotatably supported by the unit frame 591. The supply roller 56 is held in contact with an upper rear portion of the developing roller 55.

The toner cartridge 52 includes a toner container 57 containing toner as a developer. The toner container 57 is disposed above the developing unit 59. The toner is supplied from the toner container 57 to the supply roller 56. The supply roller 56 supplies the toner to the developing roller 55. The developing roller 55 supplies the toner to the photoconductive drum 54.

An exposing unit 53 is provided over the process units 50 to expose surfaces of the respective photoconductive drums 54.

An intermediate transfer belt 31 is provided under the photoconductive drums 54 so as to be opposed to the photoconductive drums 54. The intermediate transfer belt 31 is tensioned between a driven roller 32 and a drive roller 33 located in front of the driven roller 32. Primary transfer rollers 34 are opposed to the respective photoconductive drums 54, with the intermediate transfer belt 31 interposed between each of the primary transfer rollers 34 and a corresponding one of the photoconductive drums 54.

A second transfer roller 35 is held in contact with the driven roller 32, with the intermediate transfer belt 31 interposed therebetween. A belt unit 30 is constituted by the intermediate transfer belt 31, the driven roller 32, the drive roller 33, the primary transfer rollers 34, and the second transfer roller 35.

In the image forming device 5, the surface of the photoconductive drum 54 is uniformly charged by the electrically charged roller 58, and then selectively exposed by the exposing unit 53 based on predetermined image data. As a result, an electrostatic latent image based on the image data is formed on the surface of the photoconductive drum 54.

The toner contained in the toner container 57 is positively charged between the supply roller 56 and the developing roller 55 and born on a surface of the developing roller 55. The toner born on the developing roller 55 is supplied to the electrostatic latent image formed on the surface of the photoconductive drum 54, a toner image is born on the surface of the photoconductive drum 54.

The toner image born on the surface of the photoconductive drum 54 is primarily transferred to the intermediate transfer belt 31 by a transfer bias applied to the primary transfer roller 34. The toner images born on the respective photoconductive drums 54 are superposed on the intermediate transfer belt 31.

The sheet S supplied from the sheet-supply tray 10 to the conveyance path P is conveyed rearward by a plurality of conveying rollers 13 and supplied to a nipping position between the intermediate transfer belt 31 and the second transfer roller 35. The sheet S supplied to the nipping position is conveyed while being nipped between the intermediate transfer belt 31 and the second transfer roller 35.

A secondary transfer bias is applied to the second transfer roller 35. The polarity of the secondary transfer bias is opposite to that of electric charges on the toner images formed on the intermediate transfer belt 31. Thus, the toner images on the intermediate transfer belt 31 are secondarily transferred to the sheet S in a process in which the sheet S is conveyed between the intermediate transfer belt 31 and the second transfer roller 35.

In the present embodiment, the intermediate transfer belt 31 is configured such that the toner images are primarily transferred from the respective photoconductive drums 54 to the intermediate transfer belt 31, and the toner images primarily transferred are secondarily transferred to the sheet S. However, the intermediate transfer belt 31 may be replaced with a conveyor belt configured to convey the sheet S to which the toner images are transferred from the respective photoconductive drums 54.

The sheet S to which the toner images have been transferred is conveyed to a fixing device 16 disposed downstream of the image forming device 5. The fixing device 16 includes a heat roller 17 and a pressure roller 18 held in pressing contact with the heat roller 17. The toner images are thermally fixed to the sheet S conveyed to the fixing device 16, while the sheet S is passing through a position between the heat roller 17 and the pressure roller 18.

The sheet S to which the toner images are thermally fixed is conveyed downstream from the fixing device 16 in the conveying direction and discharged onto the sheet-discharge tray 23*a* by a sheet-discharge roller 19.

Structure for Process Unit and Drawer

Figure 2:
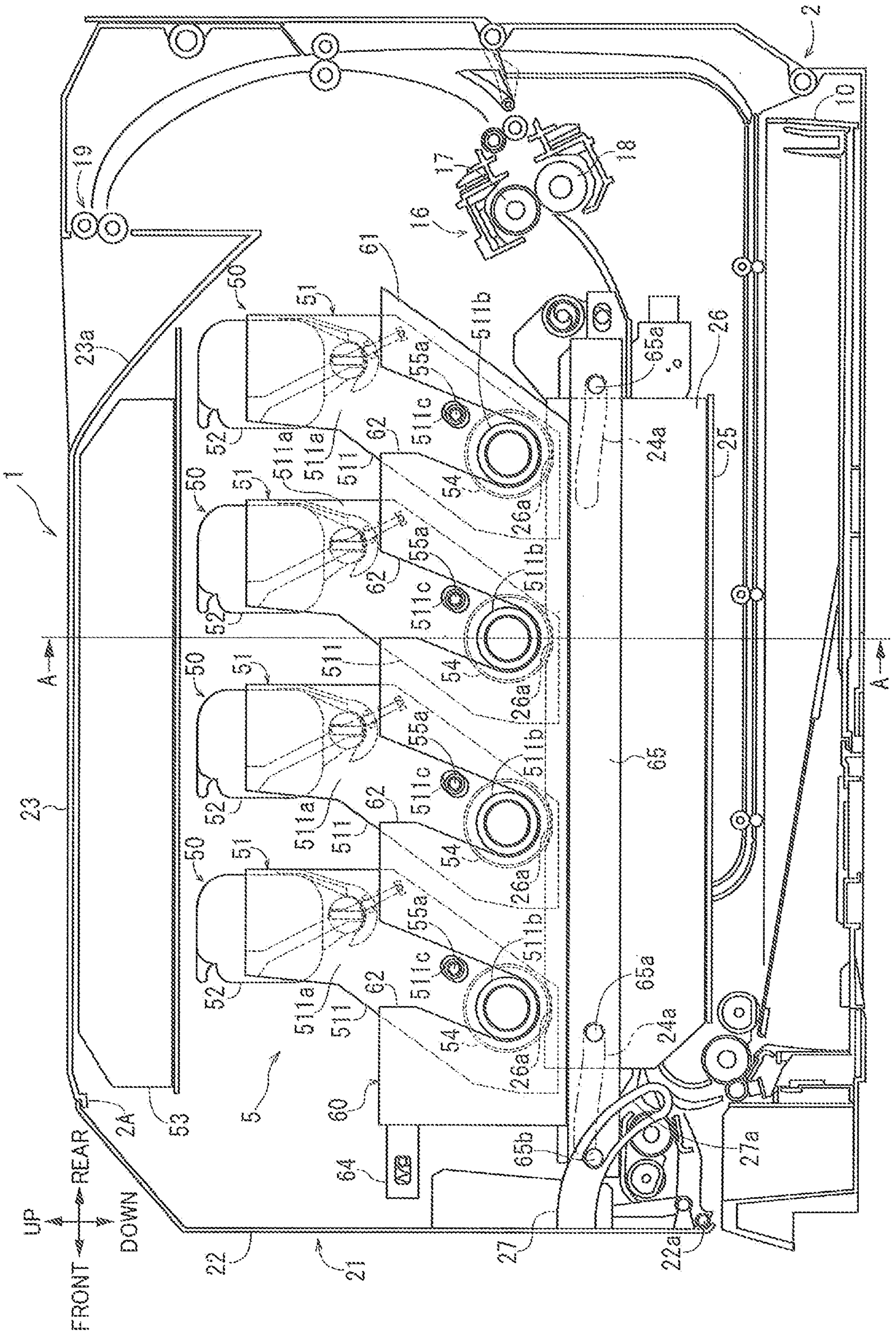
FIG. 2 is a side elevational view in cross section, illustrating the image forming apparatus in a state in which drawer guides are located at their respective positioning positions, and a drawer is located at an inner position.
Figure 3:
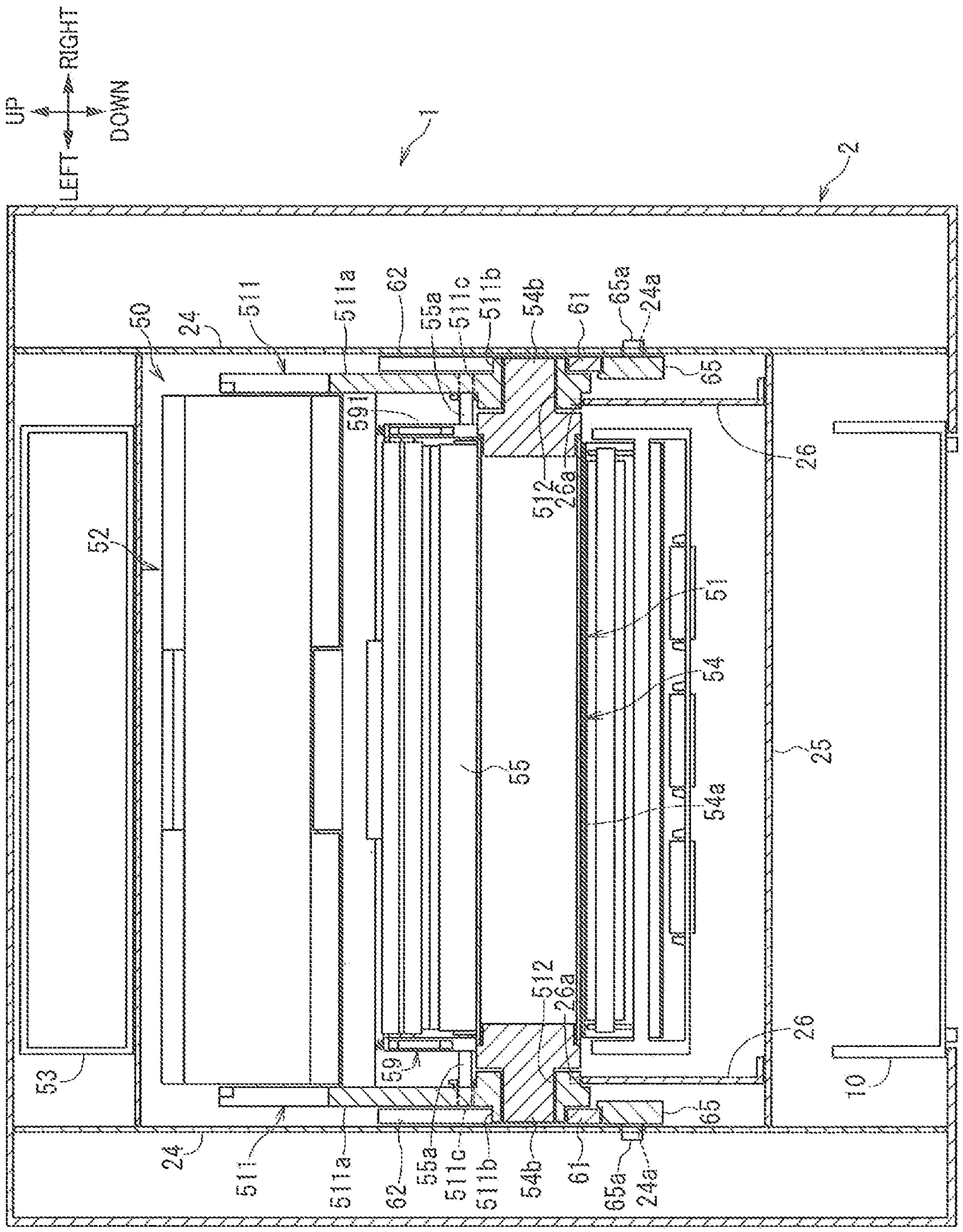
FIG. 3 is a cross-sectional view taken along line A-A in FIG. 2.

As illustrated in FIGS. 2 and 3, the drawer 60 is a substantially rectangular frame member capable of supporting the four process units 50. The drawer 60 includes a pair of side frames 61 arranged respectively on right and left sides of the process units 50 and each extending in the front and rear direction. Each of the side frames 61 includes four support grooves 62 arranged in the front and rear direction and each extending substantially in the up and down direction. An upper end of the support groove 62 is open. The number of the support grooves 62 corresponds to the number of the process units 50.

The process cartridge 51 of each of the process units 50 includes a pair of right and left cartridge frames 511 supporting a corresponding one of the photoconductive drums 54. The photoconductive drum 54 includes a drum body 54*a* and drum shafts 54*b* each protruding from the drum body 54*a* outward in the right and left direction. The cartridge frames 511 support the respective right and left drum shafts 54*b* rotatably. The drum shafts 54*b* are end portions of the photoconductive drum 54 in the axial direction, respectively.

Each of the cartridge frames 511 includes a side wall 511*a* extending in the up and down direction and a protruding portion 511*b* protruding from the side wall 511*a* outward in the right and left direction. One of the pair of the side wall 511*a* and the protruding portion 511*b* is disposed to the right of the photoconductive drum 54, and the other is disposed to the left of the photoconductive drum 54. A portion of the side wall 511*a* at which the protruding portion 511*b* is formed has a support hole 512 for supporting the drum shaft 54*b* rotatably.

The developing roller 55 includes right and left roller shafts 55*a*. Each of the roller shafts 55*a* protrudes outward from the unit frame 591 in the right and left direction. The side wall 511*a* has a guide hole 511*c* in which a corresponding one of the roller shafts 55*a* is inserted. The guide hole 511*c* is elongated such that the roller shaft 55*a* is slidable along the major axis direction of the guide hole 511*c*.

The protruding portion 511*b* of the process cartridge 51 is insertable into the support groove 62 of the side frame 61 from above. When the protruding portions 511*b* of the process cartridge 51 are inserted in the respective support grooves 62, the process unit 50 is mounted to the drawer 60.

The housing 2 includes vertical frames 24 each extending in the front and rear direction and the up and down direction. The vertical frames 24 are disposed respectively at right and left end portions of the housing 2 in the housing 2. Each of the vertical frames 24 has two guide holes 24*a*. Each of the guide holes 24*a* is an elongated hole extending substantially in the front and rear direction and inclined so as to be higher at its front portion than at its rear portion. The two guide holes 24*a* are located apart from each other in the front and rear direction.

A pair of right and left drawer guides 65 are provided in the housing 2 each on an inner side of a corresponding one of the vertical frames 24 in the right and left direction. Each of the drawer guides 65 is a rail member extending in the front and rear direction. The side frames 61 of the drawer 60 are supported on the respective drawer guides 65 so as to be movable in the front and rear direction.

The drawer guides 65 respectively include guide pins 65*a* each extending outward in the right and left direction. The guide pins 65*a* are provided so as to correspond to the respective guide holes 24*a* and slidably inserted in the respective guide holes 24*a*. Since the guide pins 65*a* are inserted in the respective guide holes 24*a*, the drawer guides 65 are supported by the respective vertical frames 24. Each of the drawer guides 65 are movable in the front and rear direction and the up and down direction relative to a corresponding one of the vertical frames 24 within a region in which the guide pins 65*a* are slidable in the respective guide holes 24*a*.

Engaging pins 65*b* each protruding outward in the right and left direction are provided on front end portions of the respective drawer guides 65. The front-surface cover 22 of the housing 2 includes link arms 27. Each of the link arms 27 has an arc shape curved rearward and downward from the front-surface cover 22. The link arms 27 respectively have engaging holes 27*a* engageable with the respective engaging pins 65*a*. Each of the engaging holes 27*a* has an arc shape curved so as to be lower at its rear portion than at its front portion.

With this configuration, the drawer 60 is movable between an inner position (illustrated in FIG. 2) and an outer position (illustrated in FIG. 4) in the front and rear direction. That is, the moving direction of the drawer 60 coincides with the front and rear direction, and a side nearer to the outer position than to the inner position in the moving direction of the drawer 60 is a front side, and a side nearer to the inner position than to the outer position in the moving direction of the drawer 60 is a rear side.

As illustrated in FIG. 2, when the drawer 60 is located at the inner position in the state in which the process cartridge 51 is mounted to the drawer 60, the process cartridge 51 and the toner cartridge 52 are contained in the housing 2.

Figure 4:
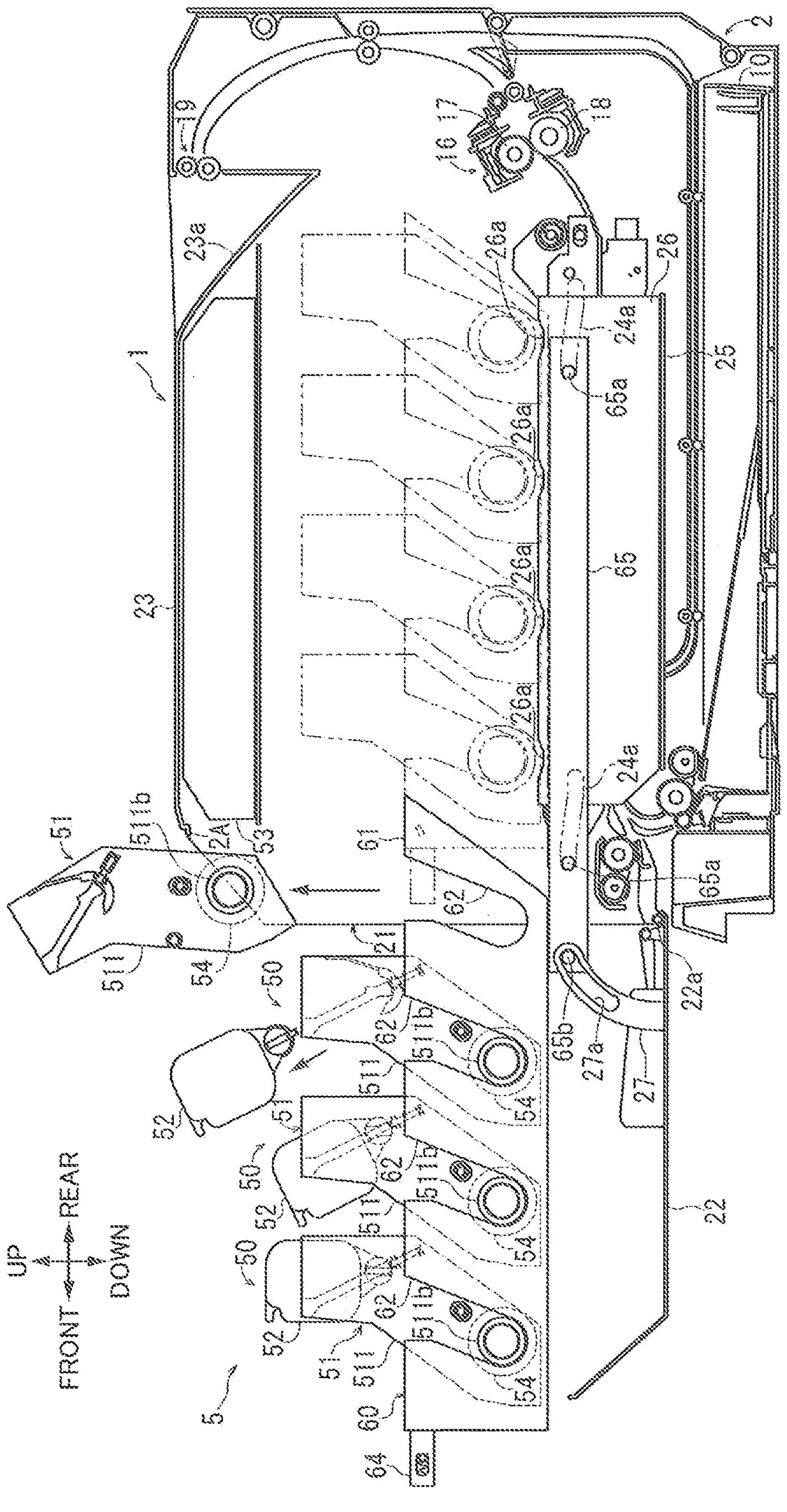
FIG. 4 is a side elevational view in cross section, illustrating the image forming apparatus in a state in which the drawer guides are located at their respective positioning cancel positions, and the drawer is located at an outer position.

As illustrated in FIG. 4, when the drawer 60 is located at the outer position in the state in which the process cartridge 51 is mounted to the drawer 60, at least a portion of the process cartridge 51 and the toner cartridge 52 is exposed to the outside of the housing 2. When the drawer 60 is located at the outer position, the process cartridge 51 and the toner cartridge 52 exposed to the outside of the housing 2 are mountable on and removable from the drawer 60.

The drawer guides 65 are movable in the front and rear direction between (i) their respective positioning positions (illustrated in FIG. 2) at which the process cartridges 51 are positioned with respect to the housing 2 and (ii) their respective positioning cancel positions (illustrated in FIG. 4) at which the positioning of the process cartridges 51 with respect to the housing 2 is canceled, and the drawer 60 is movable in the front and rear direction.

As illustrated in FIG. 2, when the front-surface cover 22 of the housing 2 is closed, the drawer 60 is located at the inner position, and the drawer guides 65 are located at their respective positioning positions. When the drawer guides 65 are located at their respective positioning positions, the guide pins 65*a* are located at rear end portions of the respective guide holes 24*a*. Thus, each of the drawer guides 65 is located at a rear and lower portion of its movable region.

The housing 2 includes a horizontal frame 25 extending in the horizontal direction between the right and left vertical frames 24. The horizontal frame 25 is disposed below the drawer guides 65. A pair of right and left support plates 26 are provided upright on the horizontal frame 25. Each of the support plates 26 is a plate member extending in the front and rear direction. Each of the support plates 26 is disposed on an inner side of a corresponding one of the side frames 61 of the drawer 60 in the right and left direction.

An upper end of each of the support plates 26 has positioning recessed portions 26*a* formed respectively at positions corresponding to the positions of the respective process cartridges 51 in the front and rear direction. When the drawer guides 65 are located at their respective positioning positions, the cartridge frames 511 of the process cartridge 51 are supported by the respective positioning recessed portions 26*a* from below. This configuration positions the process cartridges 51 with respect to the housing 2.

It is noted that the right and left support plates 26 are sheet-metal members formed by press working using the same metal mold and having the same shape. This makes it possible to reduce positional misalignment of the photoconductive drums 54 when the process cartridges 51 are positioned.

Thus, when the drawer guides 65 are located at their respective positioning positions, the process cartridges 51 are supported by the support plates 26, thereby positioning the process cartridges 51 with respect to the housing 2.

When the front-surface cover 22 of the housing 2 is opened in the state illustrated in FIG. 2, as illustrated in FIG. 4, the link arms 27 are moved frontward, causing the engaging pins 65*b* to be engaged with rear edges of the respective engaging holes 27*a*, whereby the drawer guides 65 are pulled frontward. The drawer guides 65 pulled frontward are moved frontward to their respective positioning cancel positions.

In this case, since the guide pins 65*a* are slid from the rear end portions to the front end portions of the respective guide holes 24*a* with frontward movement of the drawer guides 65, the drawer guides 65 are also moved upward.

When the drawer guides 65 are moved frontward and upward, the drawer 60 supported by the drawer guides 65 are moved upward with the process cartridges 51. This moves the process cartridges 51 upward away from the support plates 26, thereby canceling the state in which the process cartridges 51 are supported by the support plates 26.

With the frontward and upward movement of the drawer guides 65, the drawer 60 moves upward straightly without moving frontward. The process cartridges 51 supported by the drawer 60 are also moves upward straightly. This prevents the photoconductive drums 54 supported by the respective process cartridge 51 from rubbing against the intermediate transfer belt 31 in the front and rear direction, resulting in less damage to the photoconductive drums 54 and the intermediate transfer belt 31.

Thus, when the drawer guides 65 are located at their respective positioning cancel positions, the state in which the process cartridges 51 are supported by the support plates 26 is canceled. This cancels the positioning of the process cartridges 51 with respect to the housing 2, making the drawer 60 movable in the front and rear direction.

When the front-surface cover 22 is opened, the drawer 60 becomes movable in the front and rear direction. The user in this state can grasp a handle 64 of the drawer 60 located at the inner position (see the drawer 60 indicated by the two-dot chain lines in FIG. 4) and pull the drawer 60 frontward to move the drawer 60 to the outer position (see the drawer 60 indicated by the solid lines in FIG. 4).

In the state in which the drawer 60 is located at the outer position, the process cartridges 51 and the toner cartridges 52 of the process units 50 exposed to the outside of the housing 2 are mountable to and removable from the drawer 60.

The drawer 60 can be moved to the inner position by pressing the drawer 60 located at the outer position, rearward. When the front-surface cover 22 is closed in the state in which the drawer guides 65 are located at their respective positioning cancel positions as a result of opening of the front-surface cover 22, the engaging pins 65*b* are engaged with front edges of the respective engaging holes 27*a*, whereby the drawer guides 65 are pressed rearward. When the drawer guides 65 are pressed rearward, the drawer guides 65 are moved rearward to their respective positioning positions.

Toner Cartridge

Figure 5A:
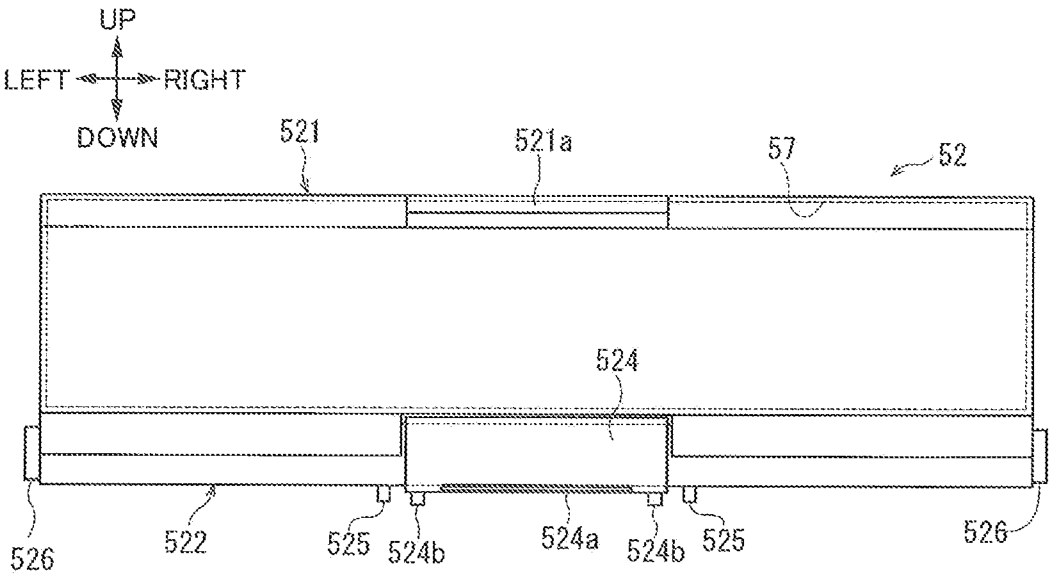
FIG. 5A is a front elevational view of a toner cartridge.
Figure 5B:
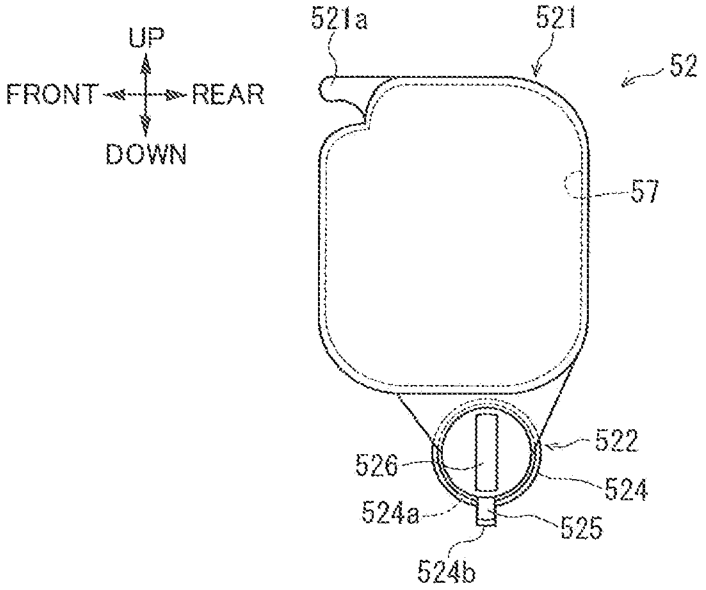
FIG. 5B is a side view of the toner cartridge.
Figure 6:
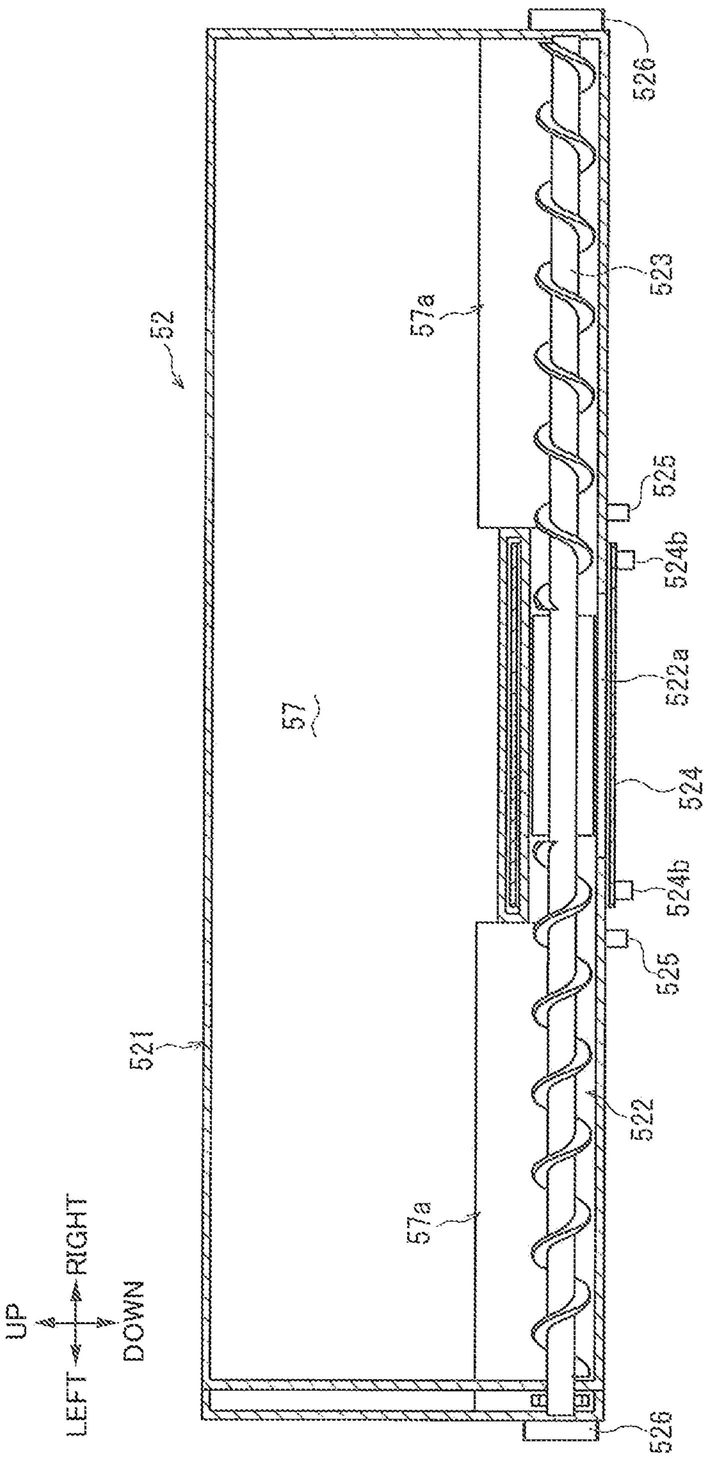
FIG. 6 is an elevational cross-sectional view of the toner cartridge.

As illustrated in FIGS. 5 and 6, each of the toner cartridges 52 includes a toner frame 521 formed with the toner container 57. A handle 521*a* is formed at an upper end portion of the toner frame 521. The user is allowed to grasp the handle 521*a* when removing the toner cartridge 52 from the process cartridge 51.

A toner supplier 522 is formed below the toner container 57 in the toner frame 521. The toner supplier 522 is for supplying the toner stored in the toner container 57, to the supply roller 56.

The toner supplier 522 communicates at its right and left end portions with the toner container 57 respectively via communicating holes 57*a* so as to allow the toner stored in the toner container 57 to flow into the toner supplier 522 via the communicating holes 57*a*. A screw 523 is provided in the toner supplier 522. The screw 523 is disposed such that its axis direction coincides with the right and left direction and is configured such that the toner having flowed in the right and left end portions of the toner supplier 522 via the respective communicating holes 57*a* is transferred toward the center of the toner supplier 522 in the right and left direction.

A lower portion of the toner supplier 522 has an arc shape protruding downward in side view. A lower end portion of a central portion of the toner supplier 522 in the right and left direction has a supply hole 522*a* through which the toner supplied from the toner container 57 is allowed to pass. The supply hole 522*a* is elongated with its longitudinal direction coinciding with the right and left direction.

The toner cartridge 52 includes a first shutter 524 capable of exposing and closing the supply hole 522*a*. The first shutter 524 is disposed at the central portion of the toner supplier 522 in the right and left direction. The first shutter 524 is a substantially cylindrical member mounted around the toner supplier 522 such that the axis direction of the first shutter 524 coincides with the right and left direction. The first shutter 524 has a communication opening 524*a* that is an elongated hole with its longitudinal direction coinciding with the right and left direction. The communication opening 524*a* has a size corresponding to the size of the supply hole 522*a*.

First projecting portions 524*b* (each as one example of a third engaging portion) are formed on the first shutter 524 respectively at positions each located on an outer side of the supply hole 522*a* in the right and left direction. Each of the first projecting portions 524*b* protrudes downward. As illustrated in FIG. 5B, positions at which the first projecting portions 524*b* are formed on the first shutter 524 and a position at which the communication opening 524*a* is formed in the first shutter 524 are different from each other in the circumferential direction. The communication opening 524*a* is formed on a front side of the first projecting portions 524*b* in the circumferential direction.

Second projecting portions 525 (each one example of a fifth engaging portion) are formed on a lower end of the toner supplier 522 respectively at positions each located on an outer side of the first shutter 524 in the right and left direction. Each of the second projecting portions 525 protrudes downward. Positions at which the second projecting portions 525 are formed on the toner supplier 522 and a position at which the supply hole 522*a* is formed in the toner supplier 522 are the same as each other in the circumferential direction. Guide projecting portions 526 are formed respectively on right and left end portions of the toner supplier 522 so as to each protrude outward in the right and left direction. Each of the guide projecting portions 526 has a rectangular shape, with its longitudinal direction coincides with the up and down direction in side view.

The first shutter 524 is capable of exposing and closing the supply hole 522*a* of the toner supplier 522 by pivoting about the axis of the first shutter 524 relative to the toner supplier 522 of the toner frame 521.

Figure 7A:
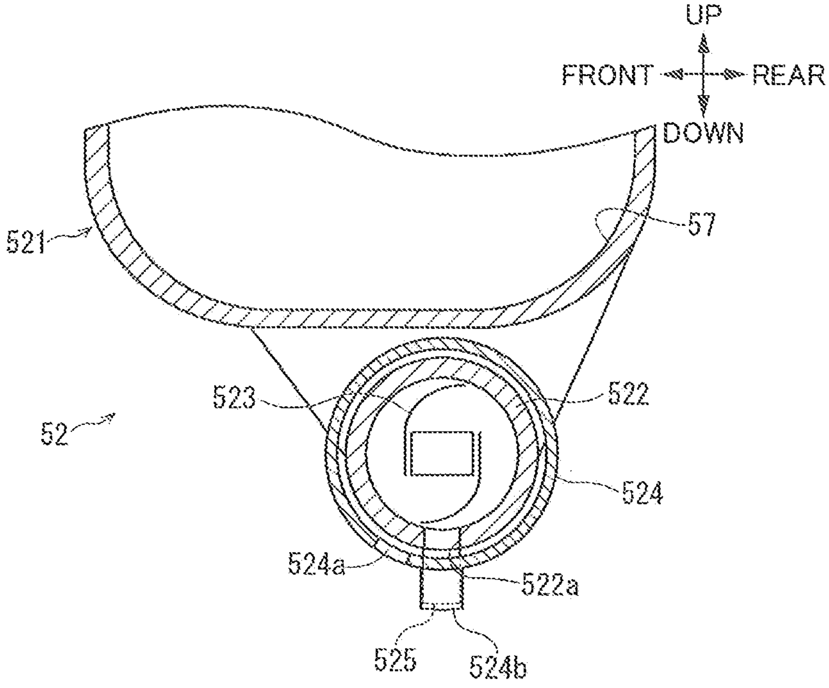
FIG. 7A is a partial side elevational view in cross section, illustrating the toner cartridge with a first shutter being closed.
Figure 8A:
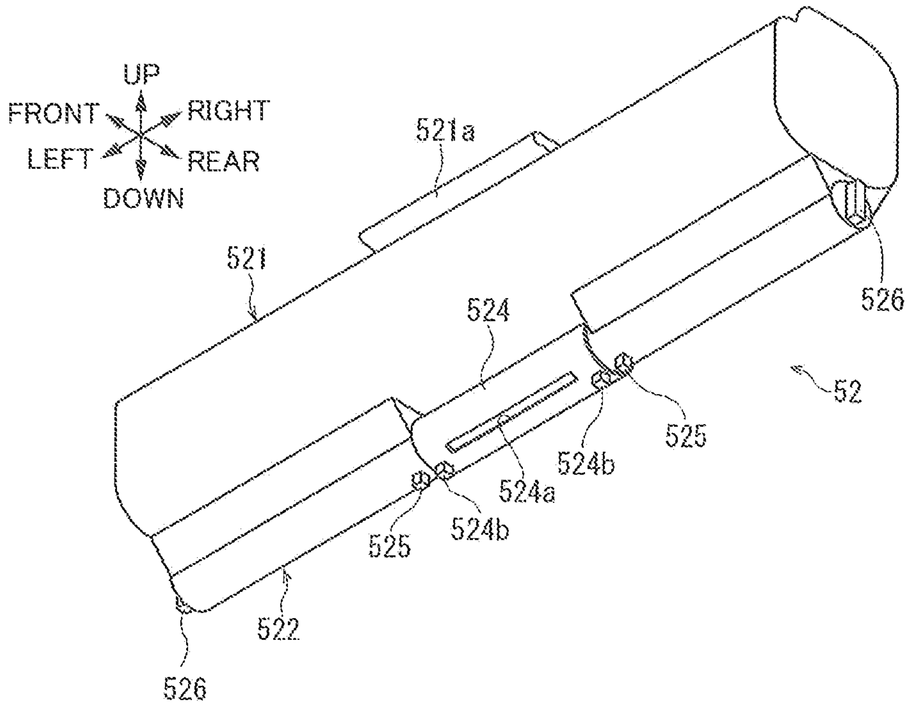
FIG. 8A is a perspective view of the toner cartridge, with the first shutter being closed.

For example, as illustrated in FIGS. 7A and 8A, when the pivot position of the first shutter 524 is located at a position at which the supply hole 522*a* of the toner supplier 522 and the communication opening 524*a* of the first shutter 524 are different from each other in phase in the circumferential direction, the supply hole 522*a* is covered with the first shutter 524.

The state in which the supply hole 522*a* is covered with the first shutter 524 is a state in which the first shutter 524 is closed. In this case, the first projecting portions 524*b* of the first shutter 524 and the second projecting portions 525 of the toner supplier 522 are the same as each other in phase in the circumferential direction.

Figure 7B:
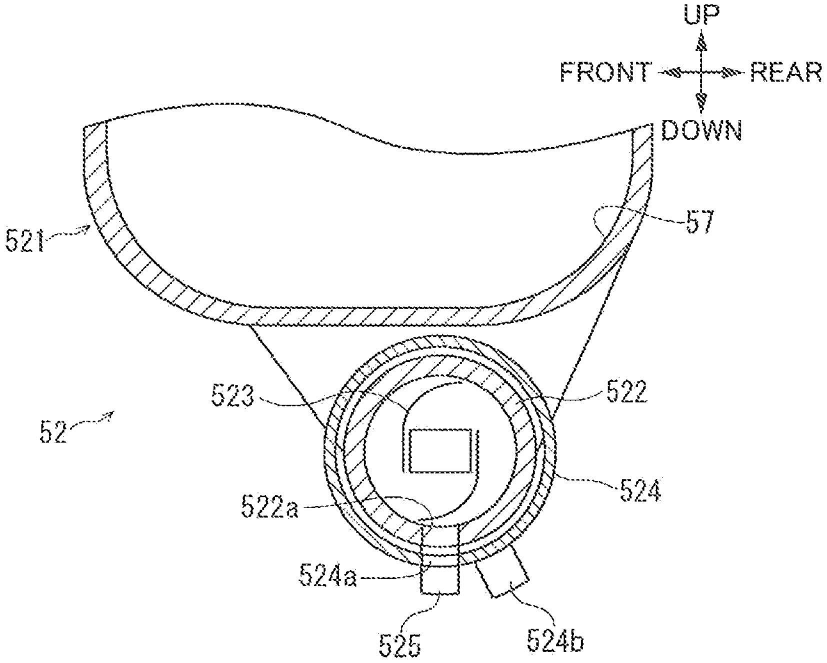
FIG. 7B is a partial side elevational view in cross section, illustrating the toner cartridge with the first shutter being open.
Figure 8B:
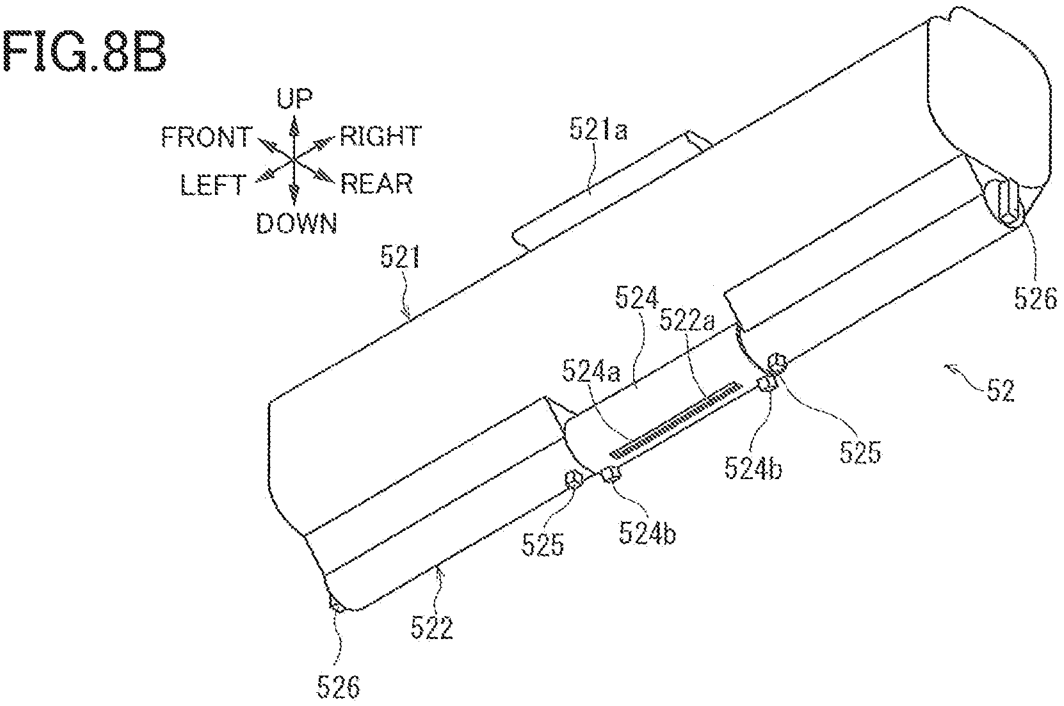
FIG. 8B is a perspective view of the toner cartridge, with the first shutter being open.
Figure 9A:
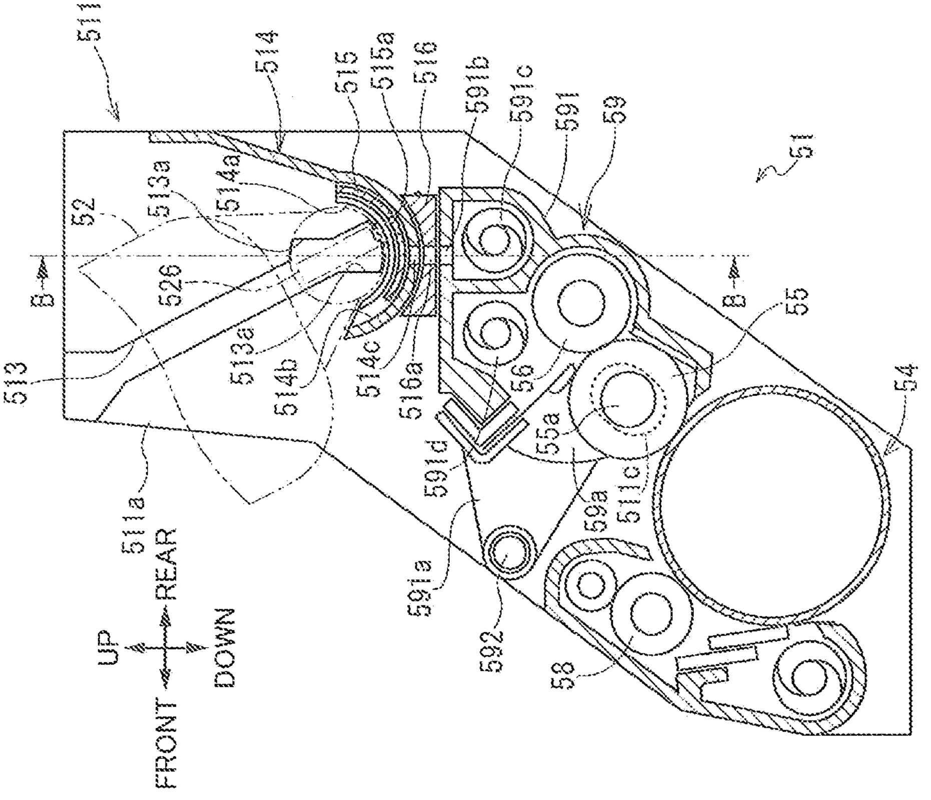
FIG. 9A is a side elevational view in cross section, illustrating a process cartridge.
Figure 9B:
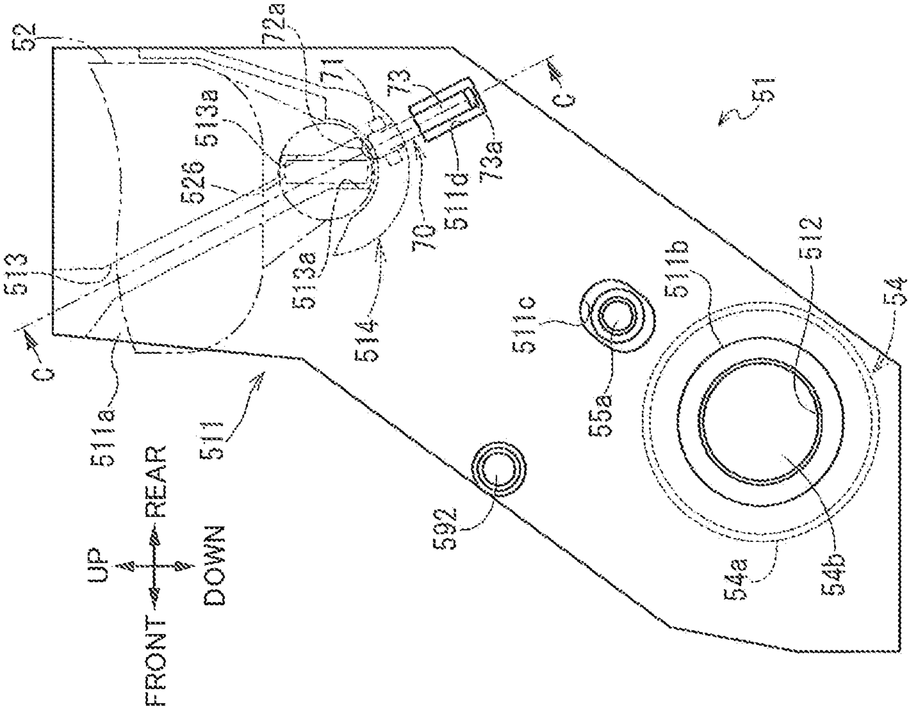
FIG. 9B is a side view of the process cartridge.
Figure 10:
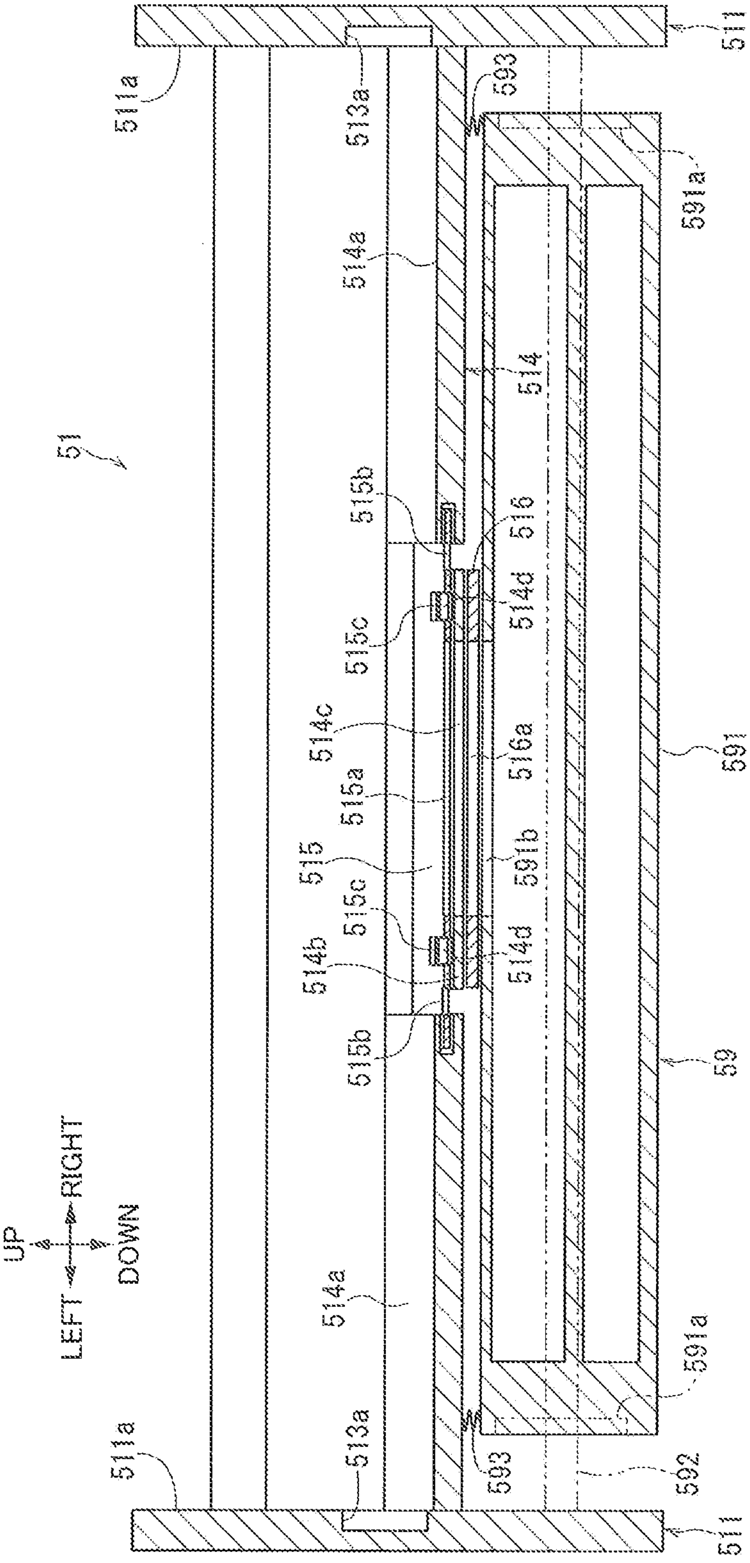
FIG. 10 is a cross-sectional view taken along line B-B in FIG. 9A.

As illustrated in FIGS. 7B and 8B, when the pivot position of the first shutter 524 is located at a position at which the supply hole 522*a* of the toner supplier 522 and the communication opening 524*a* of the first shutter 524 are the same as each other in phase in the circumferential direction, the supply hole 522*a* and the communication opening 524*a* communicate with each other, establishing a state in which the supply hole 522*a* is exposed by (not covered with) the first shutter 524.

The state in which the supply hole 522*a* is exposed by the first shutter 524 is a state in which the first shutter 524 is open. In this case, the first projecting portions 524*b* of the first shutter 524 are different from the second projecting portions 525 of the toner supplier 522 in phase in the circumferential direction, and the first projecting portions 524*b* are located on a rear side of the second projecting portions 525.

Thus, the supply hole 522*a* can be exposed and closed by the first shutter 524 in the toner cartridge 52 by causing pivotal movement of the first shutter 524 relative to the toner supplier 522 to move the first shutter 524 and the toner supplier 522 relative to each other.

Process Cartridge (Toner-Cartridge Supporter)

As illustrated in FIGS. 9A-13, the cartridge frames 511 of each of the process cartridges 51 respectively include a toner-cartridge supporter 514 extending in the right and left direction from one of the right and left side walls 511*a* to the other therebetween. The toner-cartridge supporter 514 includes support surface portions 514*a* and an open/close surface portion 514*b*. The support surface portions 514*a* are arranged respectively at right and left portions of the toner-cartridge supporter 514 to support the toner cartridge 52 mounted to the process cartridge 51. The open/close surface portion 514*b* is disposed between the right and left support surface portions 514*a*.

Each of the support surface portions 514*a* has an arc shape protruding downward in side view, and this shape corresponds to the shape of the lower portion of the toner supplier 522 of the toner frame 521. The open/close surface portion 514*b* has an arc shape protruding downward in side view. The arc shape of the open/close surface portion 514*b* is greater in diameter than the arc shape of each of the support surface portions 514*a*.

The open/close surface portion 514*b* has a supplied hole 514*c* elongated with its longitudinal direction coinciding with the right and left direction. The supplied hole 514*c* has a size corresponding to the size of the supply hole 522*a* of the toner supplier 522. First recessed portions 514*d* (each as one example of a fourth engaging portion) are formed respectively on outer sides of the supplied hole 514*c* of the open/close surface portion 514*b* in the right and left direction.

The first projecting portions 524*b* of the first shutter 524 are fitted in the respective first recessed portions 514*d* when the toner cartridge 52 is mounted to the process cartridge 51. Each of the first recessed portions 514*d* has a size and a shape corresponding to those of a corresponding one of the first projecting portions 524*b*. Positions at which the first recessed portions 514*d* are formed on the open/close surface portion 514*b* and a position at which the supplied hole 514*c* is formed are different from each other in the circumferential direction. The supplied hole 514*c* is formed on a front side of the first recessed portions 514*d* in the circumferential direction. It is noted that the first projecting portions 524*b* and the first recessed portions 514*d* at least need to be configured to be engaged respectively with each other. For example, the image forming apparatus 1 may be configured such that recessed portions are formed in the first shutter 524, and projecting portions are formed on the toner-cartridge supporter 514.

A second shutter 515 is provided on and between the cartridge frames 511 to expose and close the supplied hole 514*c* of the toner-cartridge supporter 514. The second shutter 515 is disposed over the open/close surface portion 514*b*. The second shutter 515 has an arc shape protruding downward in side view. Right and left end portions of the second shutter 515 are supported by the support surface portions 514*a* so as to be slidable in the circumferential direction.

This configuration enables the second shutter 515 to slide with respect to the open/close surface portion 514*b* in the circumferential direction.

The second shutter 515 has a communication opening 515*a* elongated with its longitudinal direction coinciding with the right and left direction. The communication opening 515*a* has a size corresponding to the size of the supply hole 522*a* of the toner supplier 522. Second recessed portions 515*b* (each one example of a sixth engaging portion) are formed on the second shutter 515 at positions each located on an outer side of the communication opening 515*a* in the right and left direction.

The second projecting portions 525 of the toner cartridge 52 are fitted in the respective second recessed portions 515*b* when the toner cartridge 52 is mounted to the process cartridge 51. Each of the second recessed portions 515*b* has a size and a shape corresponding to those of a corresponding one of the second projecting portions 525. Positions at which the second recessed portions 515*b* are formed on the second shutter 515 and a position at which the communication opening 515*a* is formed in the second shutter 515 are the same as each other in the circumferential direction.

The second shutter 515 has insertion holes 515*c* each formed between the communication opening 515*a* and a corresponding one of the second recessed portions 515*b* in the right and left direction. Each of the insertion holes 515*c* is elongated in the circumferential direction. The first projecting portions 524*b* of the first shutter 524 are insertable into the respective insertion holes 515*c*.

The insertion holes 515*c* are positioned with respect to the first recessed portions 514*d* of the open/close surface portion 514*b*, allowing the first projecting portions 524*b* to be fitted in the respective first recessed portions 514*d* in the state in which the first projecting portions 524*b* are inserted in the respective insertion holes 515*c*. The length of each of the insertion holes 515*c* in the circumferential direction is greater than that of a corresponding one of the first projecting portions 524*b*, allowing the second shutter 515 to slide in the circumferential direction in a state in which the first projecting portions 524*b* are inserted in the respective insertion holes 515*c* and fitted in the respective first recessed portions 514*d*.

The second shutter 515 exposes and closes the supplied hole 514*c* of the toner-cartridge supporter 514 by sliding with respect to the toner-cartridge supporter 514 in the circumferential direction.

Figure 12A:
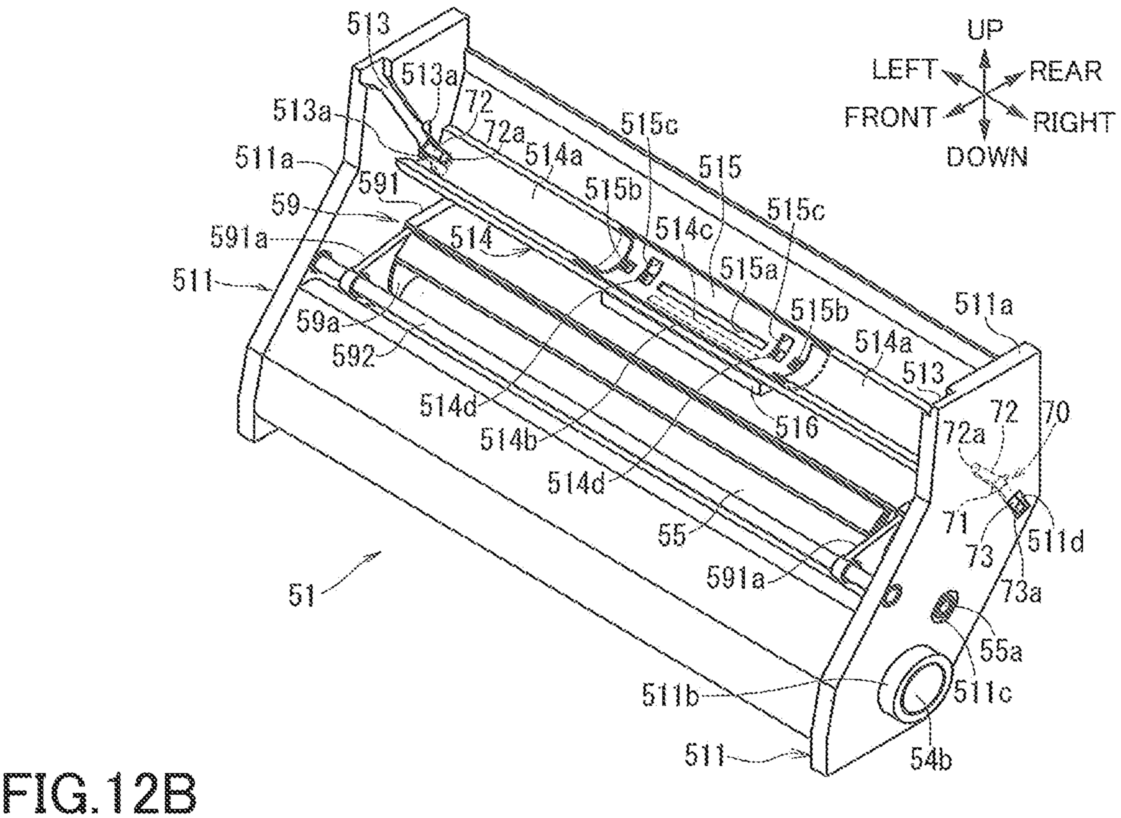
FIG. 12A is a perspective view of the process cartridge, with a second shutter being closed.

For example, as illustrated in FIG. 12A, when the pivot position of the second shutter 515 is located at a position at which the supplied hole 514*c* of the toner-cartridge supporter 514 is different from the communication opening 515*a* of the second shutter 515 in phase in the circumferential direction, the supplied hole 514*c* is covered with the second shutter 515.

The state in which the supplied hole 514*c* is covered with the second shutter 515 is a state in which the second shutter 515 is closed. In this case, the first recessed portions 514*d* of the toner-cartridge supporter 514 and the second recessed portions 515*b* of the second shutter 515 are the same in phase in the circumferential direction.

Figure 12B:
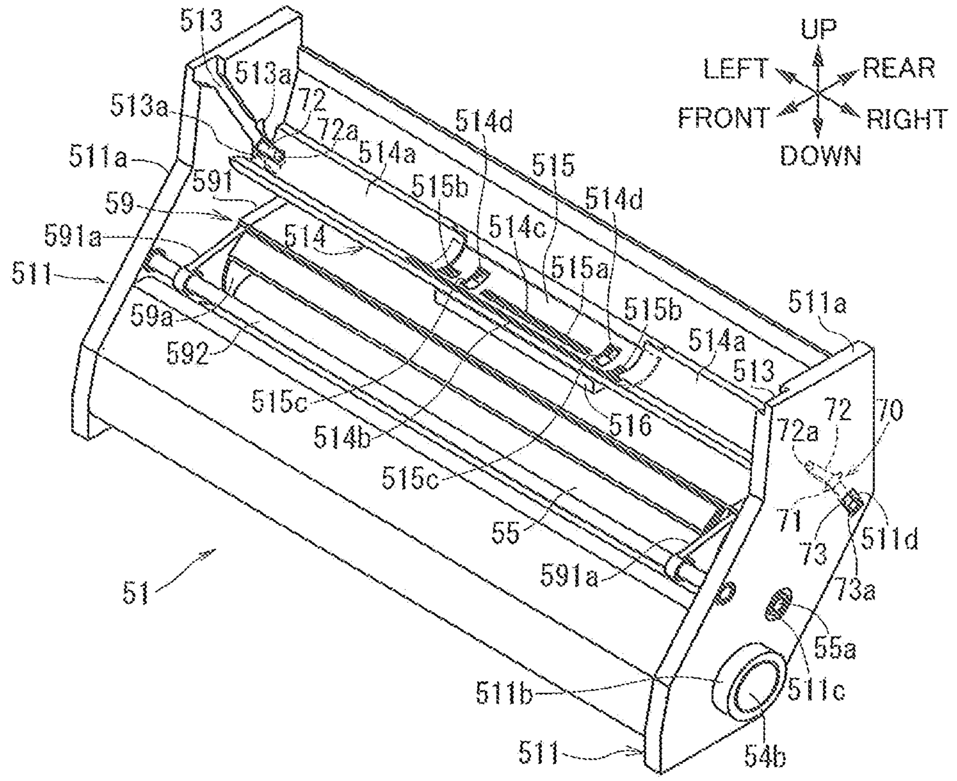
FIG. 12B is a perspective view of the process cartridge, with the second shutter being open.

As illustrated in FIG. 12B, when the pivot position of the second shutter 515 is located at a position at which the supplied hole 514*c* of the toner-cartridge supporter 514 is the same as the communication opening 515*a* of the second shutter 515 in phase in the circumferential direction, the supplied hole 514*c* and the communication opening 515*a* communicate with each other, establishing a state in which the supplied hole 514*c* is exposed by the second shutter 515.

The state in which the supplied hole 514*c* is exposed by the second shutter 515 is a state in which the second shutter 515 is open. In this case, the first recessed portions 514*d* of the toner-cartridge supporter 514 and the second recessed portions 515*b* of the second shutter 515 are different in phase in the circumferential direction, and the second recessed portions 515*b* are located on a front side of the first recessed portions 514*d*.

Thus, in the process cartridge 51, the second shutter 515 and the toner-cartridge supporter 514 can be moved relative to each other by pivotal movement of the second shutter 515 relative to the toner-cartridge supporter 514, allowing the second shutter 515 to expose and close the supplied hole 514*c*.

(Guide Groove)

Guide grooves 513 are formed in right and left inner surfaces of the side walls 511*a* of the respective cartridge frames 511. Each of the guide grooves 513 extends substantially in the up and down direction and is inclined such that a lower portion of each of the guide grooves 513 is located on a rear side of an upper portion of the guide groove 513. The guide grooves 513 are located above the toner-cartridge supporter 514.

Upper ends of the respective guide grooves 513 are open, allowing the guide projecting portions 526 of the toner cartridge 52 to be inserted into the respective guide grooves 513 from above. The toner cartridge 52 can be mounted to the process cartridge 51 by inserting the guide projecting portions 526 into the respective guide grooves 513.

When the guide projecting portions 526 are inserted into the respective guide grooves 513, each of the guide projecting portions 526 is guided along the inclined posture of a corresponding one of the guide grooves 513 in an inclined posture in which a lower end portion of the guide projecting portion 526 is located on a rear side of an upper end portion of the guide projecting portion 526. When the guide projecting portions 526 inserted into the respective guide grooves 513 have reached lower end portions of the respective guide grooves 513, the toner cartridge 52 is mounted to the process cartridge 51. The lower end portions of the respective guide grooves 513 respectively have engaging grooves 513*a*, of which width extends in a direction intersecting the direction in which the guide groove 513 extends.

The toner cartridge 52 mounted to the process cartridge 51 can pivot with respect to the process cartridge 51 between a first position (illustrated in FIG. 9A) at which the upper end portion of the toner cartridge 52 is inclined upward and a second position (illustrated in FIG. 9B) at which the upper end portion is moved rearward from the first position and stands upright.

That is, pivotal movement of the guide projecting portions 526 to be inserted into the guide grooves 513 with respect to the process cartridge 51 is restricted by the guide grooves 513 until the guide projecting portions 526 reach the lower end portions of the respective guide grooves 513. However, when the guide projecting portions 526 have reached the lower end portions of the respective guide grooves 513, the pivotal movement of the guide projecting portions 526 with respect to the process cartridge 51 is allowed by the engaging grooves 513*a* formed at the lower end portions of the respective guide grooves 513.

This allows the toner cartridge 52 located at the first position to pivot with respect to the process cartridge 51 to move to the second position. It is noted that, when the toner cartridge 52 has pivoted from the first position to the second position, rear surfaces of the respective guide projecting portions 526 come into contact with the respective engaging grooves 513*a*, thereby preventing further rearward pivotal movement of the toner cartridge 52.

When the toner cartridge 52 is located at the second position, upper surfaces of the respective guide projecting portions 526 are in contact with the respective engaging grooves 513*a*, preventing upward movement of the toner cartridge 52 with respect to the process cartridge 51. This prevents the toner cartridge 52 located at the second position from coming out of the process cartridge 51.

(Developing Unit)

The unit frame 591 of the developing unit 59 has developing chambers 59*a*. The developing roller 55 and the supply roller 56 are disposed in the developing chambers 59*a*. The unit frame 591 includes support stays 591*a* each protruding frontward. The support stays 591*a* are provided on the right and left end portions of the unit frame 591. The developing unit 59 includes a support shaft 592 extending in the right and left direction and supported by the right and left side walls 511*a*.

The support stays 591*a* are pivotably supported by the support shaft 592. As a result, the unit frame 591 of the developing unit 59 is supported by the cartridge frames 511 so as to be pivotable about the support shaft 592. That is, the developing unit 59 is supported by the cartridge frames 511 so as to be swingable with respect to the photoconductive drum 54.

Each of the guide holes 511*c* of the respective side walls 511*a* is elongated with its major axis direction coinciding with a direction in which the roller shaft 55*a* of the developing roller 55 pivots about the support shaft 592. Each of the roller shafts 55*a* is slidable in an area of a corresponding one of the guide holes 511*c*.

When the roller shafts 55*a* are slid in the areas of the respective guide holes 511*c*, the unit frame 591 is pivotable in a direction in which the developing roller 55 is in pressing contact with the photoconductive drum 54 and in a direction in which the developing roller 55 moves away from the photoconductive drum 54. The unit frame 591 is urged in the direction in which the developing roller 55 is in pressing contact with the photoconductive drum 54 by an urging spring 593 disposed between the unit frame 591 and the toner-cartridge supporter 514.

Thus, the unit frame 591 of the developing unit 59 is supported by the cartridge frames 511 of the process cartridge 51 so as to be pivotable about the support shaft 592. As a result, the developing roller 55 supported by the developing unit 59 also becomes pivotable with respect to the photoconductive drum 54, resulting in stable contact state of the developing roller 55 with the photoconductive drum 54.

The pivotal direction of the developing roller 55 pivoting with the unit frame 591 is limited by the guide holes 511*c* to the direction in which the developing roller 55 is in pressing contact with the photoconductive drum 54 and the direction in which the developing roller 55 moves away from the photoconductive drum 54. This prevents the positions of one and the other end portions of the developing roller 55 from moving in the circumferential direction of the photoconductive drum 54, for example, making it possible to keep the parallelism of the developing roller 55 and the photoconductive drum 54.

An upper surface of the unit frame 591 has an opening 591*b* elongated with its longitudinal direction coinciding with the right and left direction. The opening 591*b* is formed in the open/close surface portion 514*b* below the supplied hole 514*c*. The opening 591*b* has a size corresponding to the size of the supplied hole 514*c*.

The opening 591*b* and the supplied hole 514*c* overlap each other in position when viewed in the up and down direction, and communicate with each other. The toner to be supplied to the developing unit 59 is allowed to pass through the opening 591*b* and the supplied hole 514*c*. When the second shutter 515 is open, the toner is suppliable into the unit frame 591 through the supplied hole 514*c* and the opening 591*b*.

The toner supplied into the unit frame 591 is supplied to the supply roller 56 in the developing chambers 59*a* by screws 591*c*, 591*d* disposed in the unit frame 591. Thus, the developing unit 59 has the opening 591*b* for supplying the toner to the developing chambers 59*a*.

(Resilient Member)

A resilient member 516 is provided between the upper surface of the unit frame 591 and the open/close surface portion 514*b* of the toner-cartridge supporter 514. The resilient member 516 has a communication opening 516*a* elongated with its longitudinal direction coinciding with the right and left direction. The communication opening 516*a* has a size corresponding to the size of the supplied hole 514*c* of the open/close surface portion 514*b*.

The communication opening 516*a* overlaps the supplied hole 514*c* and the opening 591*b* in position when viewed in the up and down direction. The communication opening 516*a* and each of the supplied hole 514*c* and the opening 591*b* communicate with each other.

A space is formed between the upper surface of the unit frame 591 and the open/close surface portion 514*b* in the up and down direction. This space is filled with the resilient member 516. In this construction, since the resilient member 516 has the communication opening 516*a*, a space between a portion of the upper surface of the unit frame 591 around the opening 591*b* and a portion of the open/close surface portion 514*b* around the supplied hole 514*c* is filled with the resilient member 516.

The resilient member 516 is a sponge member, for example, which is extended and contracted by elastic deformation of the resilient member 516. Thus, even in the case where the unit frame 591 is swung about the support shaft 592 with respect to the cartridge frames 511 to change the size of the space between the unit frame 591 and the open/close surface portion 514*b*, this space can be filled by the resilient member 516 following the operation.

This prevents the toner having passed through the supplied hole 514*c* from leaking to the outside from the space between the unit frame 591 and the open/close surface portion 514*b*.

(Lock Member)

The process cartridge 51 includes a pair of right and left lock members 70 movable between a lock position at which the lock members 70 lock the process cartridge 51 to the drawer 60 and a release position at which the lock between the process cartridge 51 and the drawer 60 is released. Each of the lock members 70 is disposed at a joint position between the toner-cartridge supporter 514 and a corresponding one of the side walls 511*a* of the respective cartridge frames 511. Each of the lock members 70 includes a pivot shaft 71, an operating arm 72, and a lock arm 73.

The pivot shaft 71 is pivotably supported by the side wall 511*a* in a state in which the axis direction of the pivot shaft 71 coincides with the front and rear direction. The operating arm 72 extends inward from the pivot shaft 71 in the right and left direction and pivotable with the pivot shaft 71. An operating projection 72*a* protruding upward is formed at a distal end portion of the operating arm 72. The lock arm 73 extends downward from the pivot shaft 71 pivotably with the pivot shaft 71. A lock projection 73*a* (as one example of a first engaging portion) protruding outward in the right and left direction is formed at a lower end portion of the lock arm 73.

Figure 11:
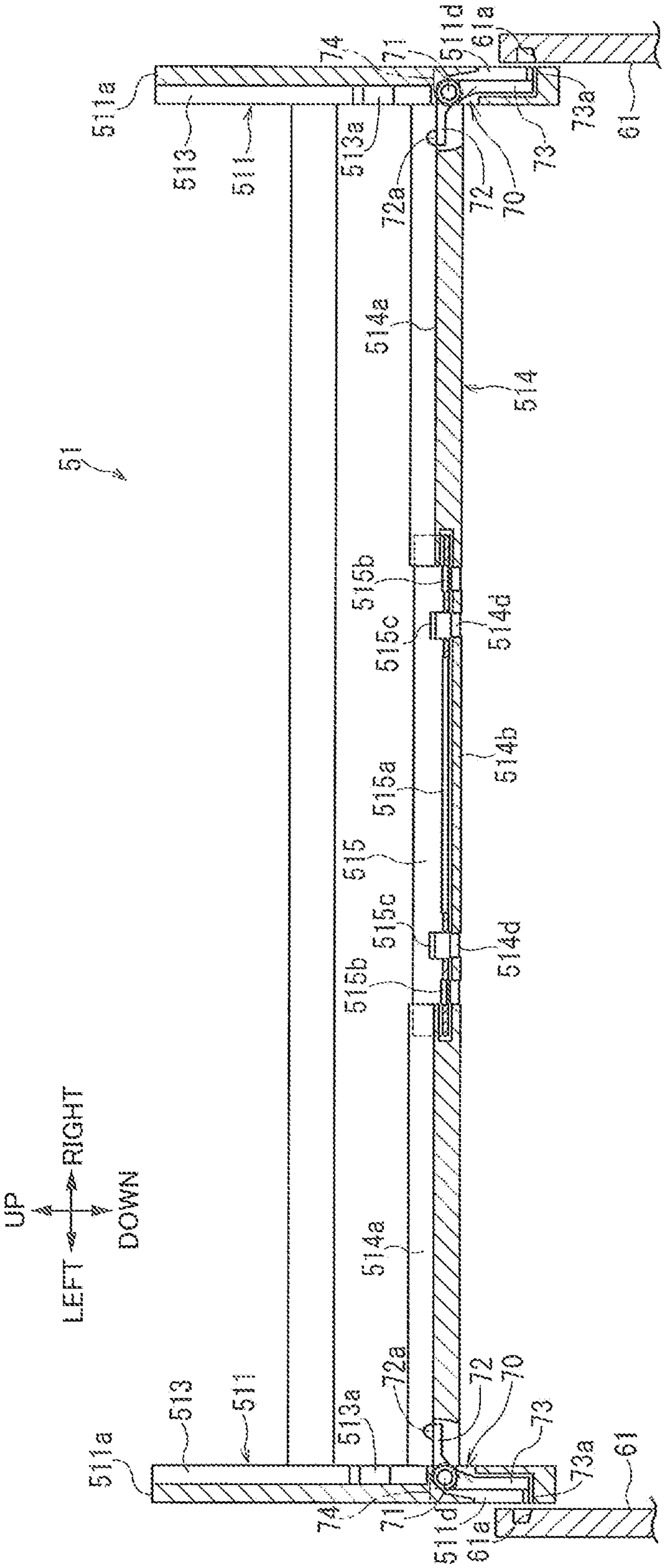
FIG. 11 is a cross-sectional view taken along line C-C in FIG. 9B.
Figure 13:
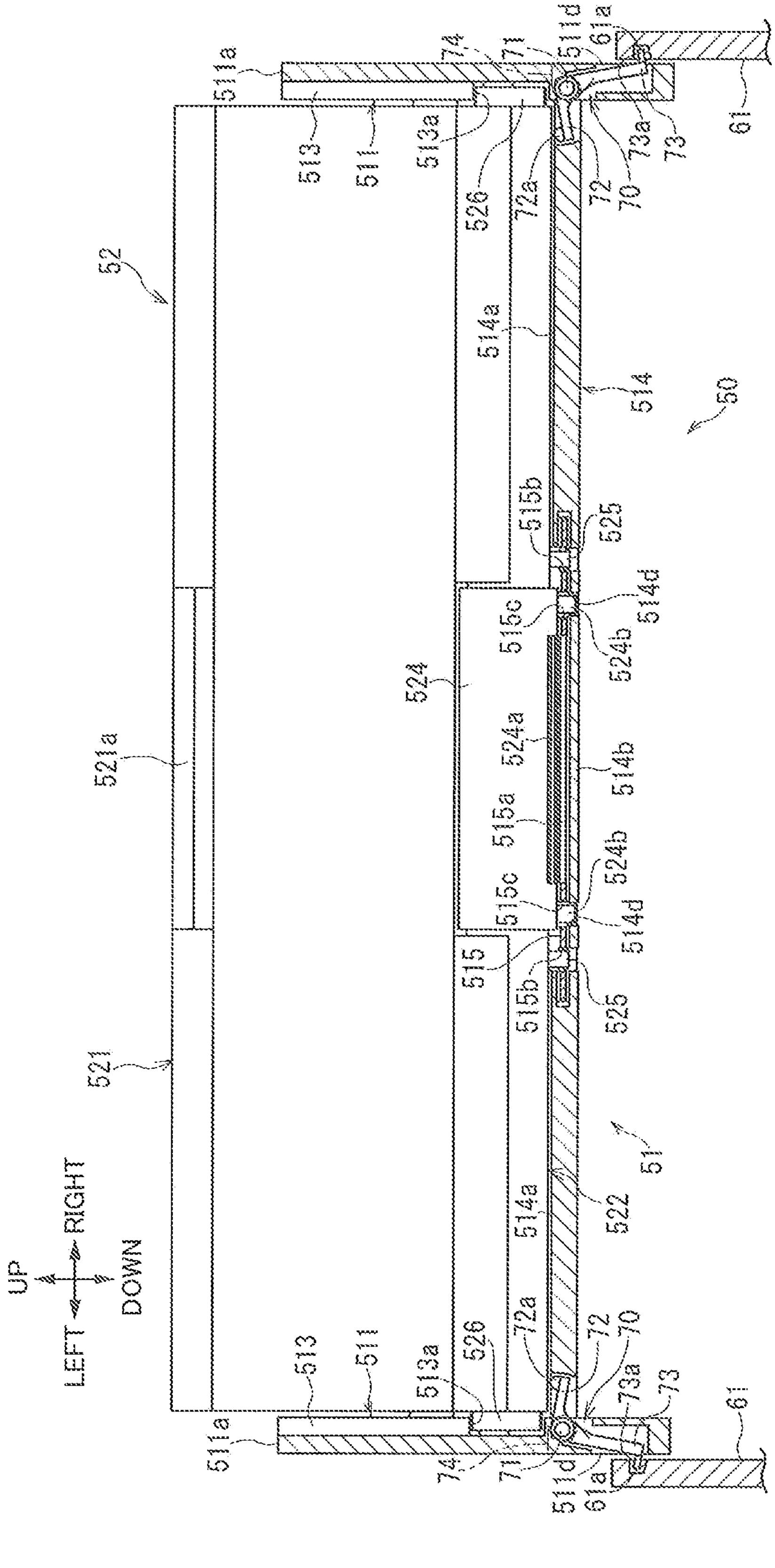
FIG. 13 is an elevational cross-sectional view of a process unit in a state in which the toner cartridge is mounted to the process cartridge, and a lock member is located at a lock position.

As illustrated in FIG. 11, when the lock member 70 is located at the release position, the operating projection 72*a* of the operating arm 72 protrudes upward from the support surface portion 514*a* of the toner-cartridge supporter 514, and the lock projection 73*a* of the lock arm 73 does not protrude outward from the side wall 511*a* in the right and left direction. As illustrated in FIG. 13, when the lock member 70 is located at the lock position, the operating projection 72*a* of the operating arm 72 does not protrude upward from the support surface portion 514*a*, and the lock projection 73*a* of the lock arm 73 protrudes outward from the side wall 511*a* in the right and left direction.

Each of the side wall 511*a* has an opening 511*d* opening in its outer surface in the right and left direction. The lock projection 73*a* of the lock arm 73 can protrude from the side wall 511*a* through the opening 511*d* in the right and left direction.

In the state in which the process cartridge 51 is mounted to the drawer 60, the side walls 511*a* of the process cartridge 51 and the respective side frames 61 of the drawer 60 are opposed to each other. A lock hole 61*a* (as one example of a second engaging portion) is formed in a surface of each of the side frames 61 which faces a corresponding one of the side walls 511*a*. The lock projection 73*a* of the lock arm 73 which protrudes outward from the side wall 511*a* in the right and left direction is insertable into the lock hole 61*a*. It is noted that the lock projection 73*a* and the lock hole 61*a* at least need to be engaged with each other to lock the process cartridge 51 and the toner cartridge 52 to each other. For example, the image forming apparatus 1 may be configured such that the lock arm 73 has a lock hole, and a lock projection is formed on the side frame 61.

That is, the lock members 70 include the respective lock projections 73*a* to be inserted into the respective lock holes 61*a* of the drawer 60, and the drawer 60 has the lock holes 61*a* in which the lock projections 73*a* of the respective lock members 70 are inserted.

Each of the lock members 70 includes an urging spring 74 urging the lock member 70 toward the release position. When the lock member 70 is in a natural state in which no operating force acts on the operating arm 72, the lock member 70 is located at the release position by the urging force of the urging spring 74.

When the operating projection 72*a* of the operating arm 72 is pressed downward, the operating arm 72 pivots downward, and the lock arm 73 pivots outward in the right and left direction against the urging force of the urging spring 74, moving the lock member 70 to the lock position.

As illustrated in FIG. 11, in a state in which the process cartridge 51 is mounted to the drawer 60, and the toner cartridge 52 is removed from the process cartridge 51, no operating force acts on the operating arm 72, keeping the lock member 70 at the release position.

When the lock member 70 is located at the release position, the lock projection 73*a* does not protrude outward from the side wall 511*a* in the right and left direction, and thus the lock projection 73*a* is not inserted in the lock hole 61*a*, so that the lock between the process cartridge 51 and the drawer 60 is released. In the state in which the lock between the process cartridge 51 and the drawer 60 is released, the process cartridge 51 is allowed to move with respect to the drawer 60, allowing the process cartridge 51 to be removed from the drawer 60.

When the toner cartridge 52 is mounted to the process cartridge 51 mounted to the drawer 60 illustrated in FIG. 11, the toner supplier 522 of the toner cartridge 52 comes into contact with the operating projections 72*a* of the respective operating arms 72, thereby pressing the operating projections 72*a* downward.

As illustrated in FIG. 13, when the operating projections 72*a* are pressed downward by the toner cartridge 52, the lock members 70 are moved to the lock position, so that the lock projections 73*a* are inserted in the respective lock holes 61*a*. When the lock projections 73*a* are inserted in the respective lock holes 61*a*, the process cartridge 51 is locked to the drawer 60. In the state in which the process cartridge 51 is locked to the drawer 60, movement of the process cartridge 51 with respect to the drawer 60 is prevented, preventing separation of the process cartridge 51 from the drawer 60.

Thus, in the state in which the process cartridge 51 is mounted to the drawer 60, and the toner cartridge 52 is mounted to the process cartridge 51, the lock members 70 are located at the lock position at which the lock members 70 lock the process cartridge 51 to the drawer 60, and in the state in which the process cartridge 51 is mounted to the drawer 60, and the toner cartridge 52 is removed from the process cartridge 51, the lock members 70 are located at the release position at which the lock between the process cartridge 51 and the drawer 60 is released.

Thus, when the toner cartridge 52 mounted to the process cartridge 51 is removed from the process cartridge 51, the lock members 70 are located at the lock position, and the process cartridge 51 is locked by the lock members 70. Thus, when the toner cartridge 52 is moved from the process cartridge 51, the process cartridge 51 does not move, facilitating removing the toner cartridge 52.

In the state in which the toner cartridge 52 is removed from the process cartridge 51, the lock members 70 are located at the release position, allowing the process cartridge 51 to be removed from the drawer 60. Thus, when the process cartridge 51 is removed from the drawer 60, the process cartridge 51 can be removed without operating the lock members 70, making it possible to reduce the number of operations of the user.

When mounting the toner cartridge 52 to the process cartridge 51 in the state in which the process cartridge 51 is mounted to the drawer 60, the lock members 70 are moved from the release position to the lock position by contacting the toner cartridge 52.

Thus, when the toner cartridge 52 is mounted to the process cartridge 51, the process cartridge 51 is automatically secured to the drawer 60 by the lock members 70, making it possible to reduce the number of operations of the user.

When the lock members 70 are moved to the lock position, the lock projections 73*a* of the respective lock members 70 are inserted into the respective lock holes 61*a* of the drawer 60, making it easy to secure the process cartridge 51 to the drawer 60.

Opening and Closing of First Shutter and Second Shutter

Figure 14:
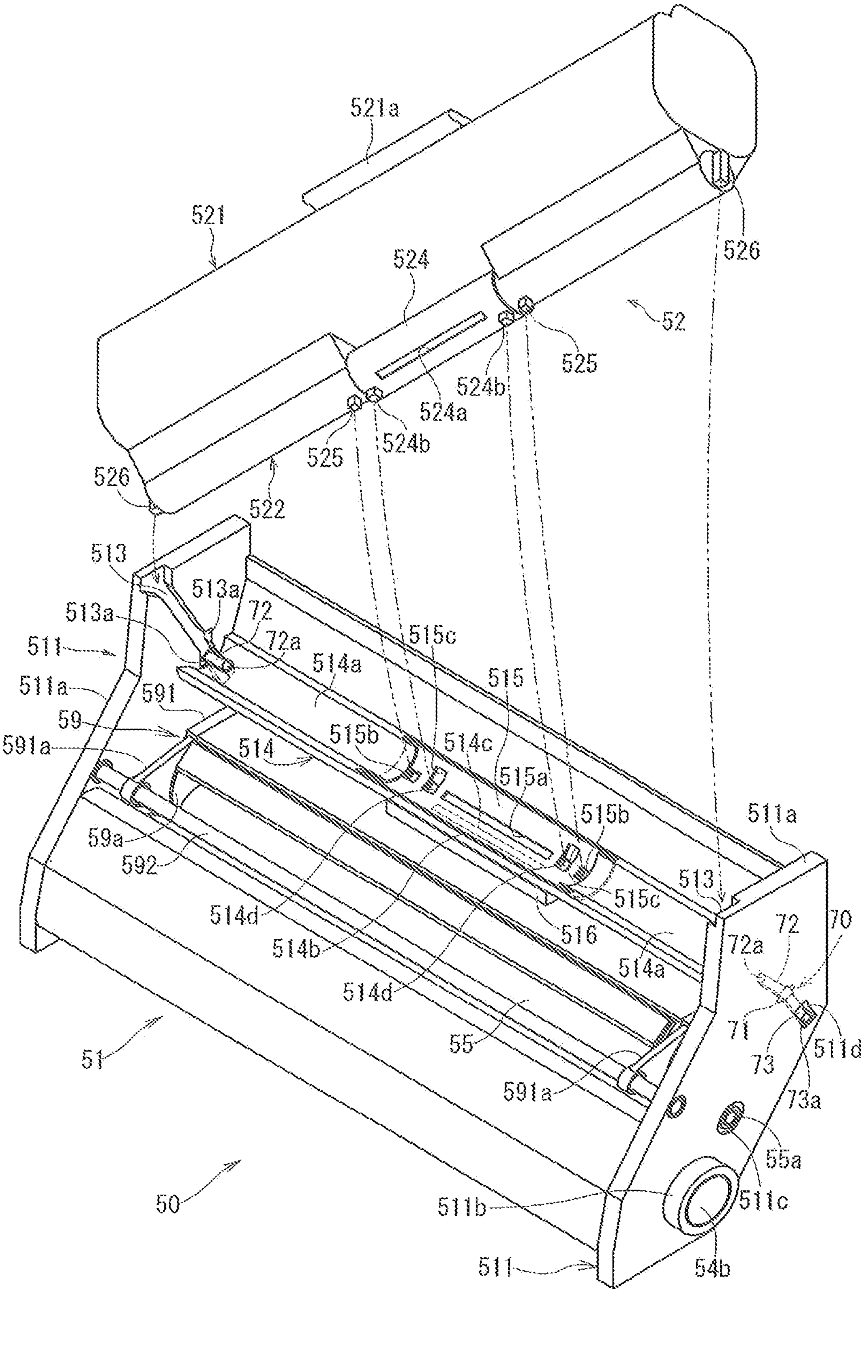
FIG. 14 is a perspective view illustrating a situation in which a first projecting portion is fitted into a first recessed portion, and a second projecting portion is fitted into a second recessed portion when the toner cartridge is mounted to the process cartridge.

As illustrated in FIG. 14, the first shutter 524 and the second shutter 515 are closed in the state in which the toner cartridge 52 is removed from the process cartridge 51.

When the guide projecting portions 526 of the toner cartridge 52 in this state are inserted in the respective guide grooves 513 of the side walls 511*a*, the toner cartridge 52 is guided in the inclined posture, and the guide projecting portions 526 reach the lower end portions of the respective guide grooves 513, so that the toner cartridge 52 is mounted to the process cartridge 51.

In this case, the first projecting portions 524*b* of the first shutter 524 are fitted in the respective first recessed portions 514*d* of the process cartridge 51, and the second projecting portions 525 of the toner cartridge 52 are fitted in the respective second recessed portions 515*b* of the second shutter 515.

Figure 15B:
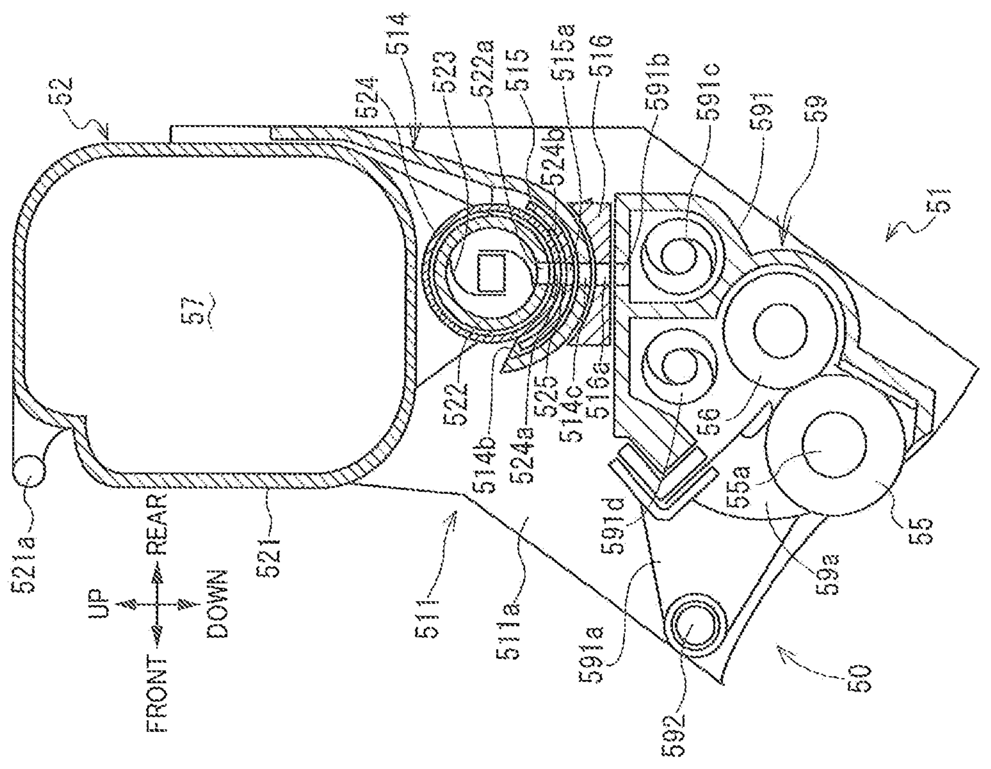
FIG. 15B is a side elevational view in cross section, illustrating a state in which the toner cartridge mounted to the process cartridge is located at a second position.
Figure 15A:
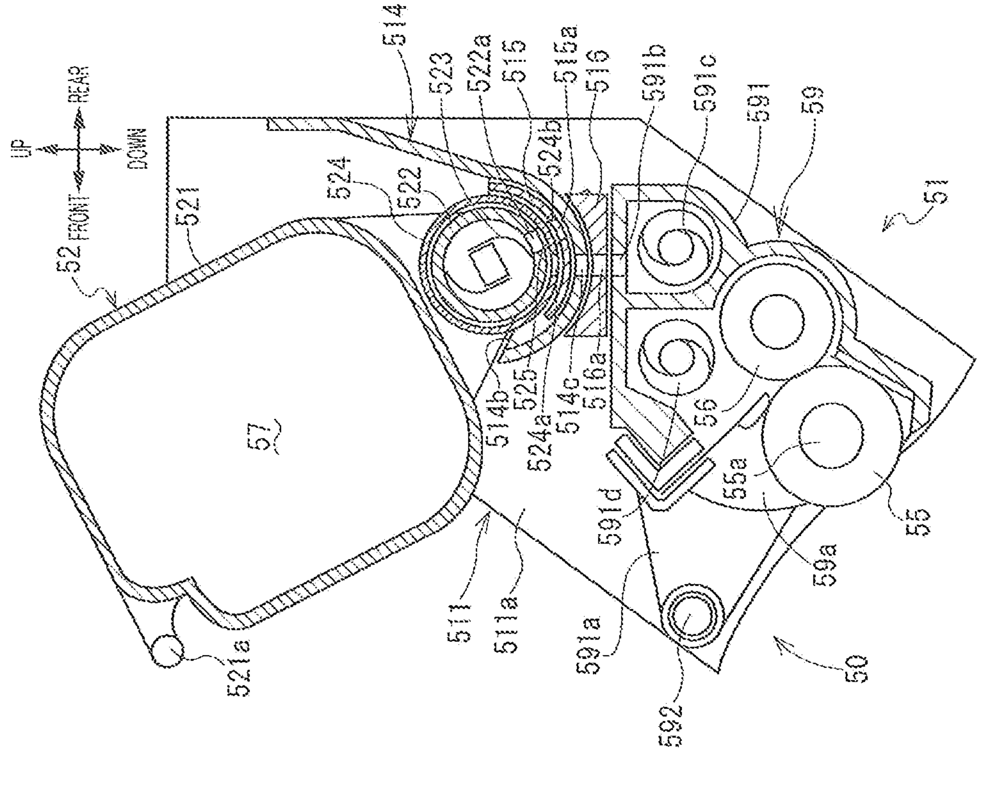
FIG. 15A is a side elevational view in cross section, illustrating a state in which the toner cartridge mounted to the process cartridge is located at a first position.

As illustrated in FIG. 15A, when the toner cartridge 52 is mounted to the process cartridge 51 by inserting the guide projecting portions 526 in the respective guide grooves 513, the toner cartridge 52 is mounted to the process cartridge 51 in the state in which the toner cartridge 52 is located at the first position.

The toner cartridge 52 mounted to the process cartridge 51 is pivotable about the axis of the toner supplier 522 with respect to the process cartridge 51. As illustrated in FIG. 15B, when the toner cartridge 52 located at the first position pivots rearward, the toner cartridge 52 is moved to the second position.

In the process unit 50, the first shutter 524 and the second shutter 515 are opened and closed by pivotal movement of the toner cartridge 52 mounted to the process cartridge 51 between the first position and the second position.

As illustrated in FIG. 15A, when the toner cartridge 52 mounted to the process cartridge 51 is located at the first position, the supply hole 522*a* of the toner frame 521 is located on a rear side of the communication opening 524*a* of the first shutter 524, so that the first shutter 524 is closed. The communication opening 515*a* of the second shutter 515 is located on a rear side of the supplied hole 514*c* of the open/close surface portion 514*b*, so that the second shutter 515 is closed.

When the toner cartridge 52 is in this state has pivoted to the second position with respect to the process cartridge 51, the position of the first shutter 524 relative to the position of the toner cartridge 52 is moved in the circumferential direction to open the first shutter 524, and the position of the second shutter 515 relative to the position of the process cartridge 51 is moved in the circumferential direction to open the second shutter 515.

Specifically, when the toner cartridge 52 has pivoted from the first position to the second position, the supply hole 522*a* of the toner frame 521 is moved frontward. The first shutter 524 does not pivot because movement of the first shutter 524 in the circumferential direction is restricted by fitting of the first projecting portions 524*b* of the first shutter 524 in the respective first recessed portions 514*d* of the process cartridge 51.

Accordingly, the position of the communication opening 524*a* of the first shutter 524 relative to the position of the supply hole 522*a* of the toner frame 521 is moved in the circumferential direction, so that the supply hole 522*a* and the communication opening 524*a* overlap each other in position when viewed in the up and down direction. As a result, the supply hole 522*a* and the communication opening 524*a* communicate with each other to open the first shutter 524.

When the toner cartridge 52 has pivoted from the first position to the second position, the second projecting portions 525 of the toner frame 521 move frontward. Since the second projecting portions 525 are fitted in the respective second recessed portions 515*b* of the second shutter 515, the second shutter 515 is moved frontward with the second projecting portions 525. The open/close surface portion 514*b* of the toner-cartridge supporter 514 does not move.

Accordingly, the position of the supplied hole 514*c* of the open/close surface portion 514*b* relative to the communication opening 515*a* of the second shutter 515 moves in the circumferential direction, so that the communication opening 515*a* and the supplied hole 514*c* overlap each other in position when viewed in the up and down direction. As a result, the communication opening 515*a* and the supplied hole 514*c* communicate with each other to open the second shutter 515.

In contrast, when the toner cartridge 52 located at the second position has pivoted to the first position with respect to the process cartridge 51, the position of the first shutter 524 relative to the position of the toner cartridge 52 is moved in the circumferential direction to close the first shutter 524, and the position of the second shutter 515 relative to the position of the process cartridge 51 is moved in the circumferential direction to close the second shutter 515.

Thus, in the process unit 50, pivotal movement of the toner cartridge 52 mounted to the process cartridge 51, with respect to the process cartridge 51 moves the position of the first shutter 524 relative to the position of the toner cartridge 52 to cause the first shutter 524 to open and close the supply hole 522*a*.

Accordingly, the first shutter 524 can be automatically opened and closed by pivotal movement of the toner cartridge 52 mounted to the process cartridge 51, with respect to the process cartridge 51, making it possible to reduce the number of operations of the user.

In the process unit 50, in particular, when the toner cartridge 52 is mounted to the process cartridge 51, the toner cartridge 52 pivots with respect to the process cartridge 51 in the state in which the first projecting portions 524*b* of the first shutter 524 are fitted in the respective first recessed portions 514*d* of the process cartridge 51, thereby moving the position of the first shutter 524 relative to the position of the toner cartridge 52 to cause the first shutter 524 to open and close the supply hole 522*a*.

Accordingly, the first projecting portions 524*b* are fitted into the respective first recessed portions 514*d* by mounting the toner cartridge 52 to the process cartridge 51, and pivotal movement of the toner cartridge 52 mounted to the process cartridge 51 is caused with respect to the process cartridge 51, making it possible to cause pivotal movement of the toner cartridge 52 and the first shutter 524 relative to each other to automatically open and close the first shutter 524. This makes it possible to reduce the number of operations of the user.

In the process unit 50, when the toner cartridge 52 is mounted to the process cartridge 51, the toner cartridge 52 pivots with respect to the process cartridge 51 in the state in which the second projecting portions 525 of the toner cartridge 52 are fitted in the respective second recessed portions 515*b* of the second shutter 515, thereby moving the position of the second shutter 515 relative to the cartridge frames 511 to cause the second shutter 515 to open and close the supplied hole 514*c*.

Accordingly, the position of the second shutter 515 relative to the cartridge frames 511 is moved by pivotal movement of the toner cartridge 52 mounted to the process cartridge 51, with respect to the process cartridge 51 to automatically open and close the second shutter 515. This makes it possible to reduce the number of operations of the user.

In the process unit 50, the lock members 70 are located at the lock position in the state in which the toner cartridge 52 is mounted to the process cartridge 51. Thus, the first position of the toner cartridge 52 is a position at which the lock members 70 are located at the lock position, and the first shutter 524 covers the supply hole 522*a* of the toner cartridge 52 in the state in which the toner cartridge 52 is mounted to the process cartridge 51. The second position of the toner cartridge 52 is a position at which the lock members 70 are located at the lock position, and the first shutter 524 exposes the supply hole 522*a* of the toner cartridge 52 in the state in which the toner cartridge 52 is mounted to the process cartridge 51.

With this configuration, when the first shutter 524 opens and closes the supply hole 522*a* of the toner cartridge 52, the toner cartridge 52 moves between the first position and the second position in the state in which the process cartridge 51 is locked by the lock members 70. This reduces movement of the process cartridge 51 when the first shutter 524 opens and closes the supply hole 522*a*, facilitating opening and closing the supply hole 522*a* of the toner cartridge 52.

In the present embodiment, the process cartridge 51 includes the photoconductive drum 54 and the cartridge frames 511. The cartridge frames 511 support the photoconductive drum 54 rotatably. The cartridge frames 511 support the developing unit 59 such that the developing unit 59 is swingable with respect to the photoconductive drum 54.

It is considered that this process cartridge 51 is configured such that the toner cartridge 52 is mounted to the developing unit 59, but such configuration causes the following problems.

First, the developing unit 59 is swingably supported in the process cartridge 51 at a position user's hand cannot reach. Thus, when mounting the toner cartridge 52 to the developing unit 59, the developing unit 59 cannot be secured to prevent swinging, making it difficult to mount the toner cartridge 52 to the developing unit 59.

Secondly, it is difficult to configure a mechanism for opening and closing the first shutter 524 of the toner cartridge 52 in conjunction with operation of mounting the toner cartridge 52 to the developing unit 59.

In the present embodiment, in contrast, the process cartridge 51 is configured such that the toner cartridge 52 is mounted to the cartridge frames 511, thereby achieving the following effects.

First, the cartridge frames 511 are easily supported by the drawer 60 so as not to move, facilitating mounting the toner cartridge 52 to the cartridge frames 511.

Secondly, the mechanism for opening and closing the first shutter 524 of the toner cartridge 5 in conjunction with an operation of mounting the toner cartridge 52 to the cartridge frames 511 can be easily achieved as a mechanism for opening and closing the first shutter 524 by causing the toner cartridge 52 to pivot with respect to the cartridge frames 511 in the state in which the first shutter 524 is coupled to the cartridge frames 511 as in the present embodiment.

The lock members 70 are preferably provided on the respective cartridge frames 511 in the case where the lock members 70 that move to the lock position at which the lock members 70 lock the process cartridge 51 to the drawer 60 by contacting the toner cartridge 52 when the toner cartridge 52 is mounted to the process cartridge 51 are provided in the construction in which the toner cartridge 52 is mounted to the cartridge frames 511.

Thus, in the case where the lock members 70 are provided on the respective cartridge frames 511 in the construction in which the toner cartridge 52 is mounted to the cartridge frames 511, the position of the lock members 70 relative to the toner cartridge 52 is stable when the toner cartridge 52 is mounted to the process cartridge 51. This ensures reliable contact of the toner cartridge 52 with the lock members 70, making it possible to reliably move the lock members 70 to the lock position.

If the lock members 70 are provided on the developing unit 59 in the construction in which the toner cartridge 52 is mounted to the cartridge frames 511, the developing unit 59 swings with respect to the cartridge frames 511 when the toner cartridge 52 is mounted to the process cartridge 51, resulting in reduction in stability of the position of the lock members 70 relative to the toner cartridge 52. This makes it difficult to design a mechanism for reliably moving the lock members 70 to the lock position.

What is claimed is:

1. An image forming apparatus, comprising:

a housing;

a toner cartridge containing toner;

a process cartridge comprising a photoconductive drum and a developing roller, the toner cartridge being mountable and removable to and from the process cartridge; and a drawer movable between an inner position and an outer position, the process cartridge being located in the housing when the drawer is located at the inner position in a state in which the process cartridge is mounted to the drawer, at least a portion of the process cartridge being exposed to an outside of the housing when the drawer is located at the outer position in the state in which the process cartridge is mounted to the drawer, wherein the process cartridge comprises a frame and an engaging portion coupled to the frame and movable, relative to the frame, between an engaging position at which the engaging portion engages with the drawer and a non-engaging position at which the engaging portion is spaced apart from the drawer.

2. The image forming apparatus according to claim 1, wherein the drawer includes an engaged portion, wherein the engaging portion is located at the engaging position at which the engaging portion engages with the engaged portion in a state in which the process cartridge is mounted to the drawer and the toner cartridge is mounted to the process cartridge, and wherein the engaging portion is located at the non-engaging position at which the engaging portion does not engages with the engaged portion in the state in which the process cartridge is mounted to the drawer and the toner cartridge is removed from the process cartridge.

3. The image forming apparatus according to claim 2, wherein the engaging portion includes an engaging projection, wherein the engaged portion includes an engaging hole, and wherein the engaging projection is inserted into the engaging hole when the engaging portion moves to the engaging position.

4. The image forming apparatus according to claim 1, wherein the process cartridge includes a pair of frames supporting the photoconductive drum, and wherein the engaging portion is formed on at least one of the pair of the frame.

5. The image forming apparatus according to claim 4, wherein the engaging portion includes a first protruding portion protruding toward an inner side of the pair of the frames and a second protruding portion protruding toward an outer side of the pair of the frames, an amount of protrusion, of the second protruding portion at which the engaging portion is located at the non-engaging position, toward the outer side of the pair of frames being smaller than that of the second protruding portion at which the engaging portion is located at the engaging position.

6. The image forming apparatus according to claim 5, wherein when mounting the toner cartridge to the process cartridge, the toner cartridge contacts the engaging portion to move the engaging portion from the non-engaging position to the engaging position.

7. The image forming apparatus according to claim 5, wherein the first protruding portion and the second protruding portion respectively extend in directions that are orthogonal to each other, and wherein the engaging portion is pivotable about an axis extending in a direction orthogonal to both a direction in which the first protruding portion extends and a direction in which the second protruding portion extends.

8. The image forming apparatus according to claim 1, wherein when mounting the toner cartridge to the process cartridge, the toner cartridge contacts the engaging portion to move the engaging portion from the non-engaging position to the engaging position.

* * * * *